(12) United States Patent
Inomata

(10) Patent No.: US 10,936,149 B2
(45) Date of Patent: Mar. 2, 2021

(54) INFORMATION PROCESSING METHOD AND APPARATUS FOR EXECUTING THE INFORMATION PROCESSING METHOD

(71) Applicant: COLOPL, Inc., Tokyo (JP)

(72) Inventor: Atsushi Inomata, Kanagawa (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 16/752,695

(22) Filed: Jan. 27, 2020

(65) Prior Publication Data

US 2020/0159389 A1 May 21, 2020

Related U.S. Application Data

(63) Continuation of application No. 16/289,593, filed on Feb. 28, 2019, now Pat. No. 10,599,286, which is a (Continued)

(30) Foreign Application Priority Data

Mar. 8, 2017 (JP) .............................. JP2017-044038
Mar. 8, 2017 (JP) .............................. JP2017-044043
Mar. 8, 2017 (JP) .............................. JP2017-044046

(51) Int. Cl.
*G06F 3/0481* (2013.01)
*A63F 13/212* (2014.01)
(Continued)

(52) U.S. Cl.
CPC ........ *G06F 3/04815* (2013.01); *A63F 13/211* (2014.09); *A63F 13/212* (2014.09);
(Continued)

(58) Field of Classification Search
CPC .... G06F 3/04815; G06F 3/0346; G06F 3/017; G06F 3/011; A63F 13/25; A63F 13/211;
(Continued)

(56) References Cited

U.S. PATENT DOCUMENTS 6,614,435 B1 * 9/2003 Tsujimoto ............... A63F 13/10
345/473
2007/0109296 A1 5/2007 Sakagawa et al.
(Continued)

FOREIGN PATENT DOCUMENTS

JP 2000-306120 A 11/2000
JP 2004-54590 A 2/2004
(Continued)

OTHER PUBLICATIONS

PlayStation VR Official Site, [Online], SONY, Searched Feb. 8, 2017, Retrieved Mar. 12, 2018, URL: http://www.ip.playstation.com/psvr/, 17pp.
(Continued)

*Primary Examiner* — Andrew Sasinowski
(74) *Attorney, Agent, or Firm* — Hauptman Ham, LLP

(57) ABSTRACT

A method includes providing a virtual space to a first user via a head-mounted device (HMD) including a display. The virtual space includes a first avatar associated with the first user, a character object operable based on an input operation on a controller, a second avatar associated with a second user, and a virtual camera defining a field-of-view image to be provided to the HMD. The method further includes determining a viewpoint mode. In a first viewpoint mode the virtual camera is associated with a viewpoint of the first avatar. In a second viewpoint mode the virtual camera is associated with a viewpoint of the character object. The viewpoint is determined based on at least one of an input operation determined in advance on the controller or a state of the controller. The method includes providing the field-of-view image via the HMD in accordance with the determined viewpoint mode.

20 Claims, 26 Drawing Sheets

Related U.S. Application Data continuation of application No. 15/915,955, filed on Mar. 8, 2018, now Pat. No. 10,365,784.

(51) Int. Cl.

| | | |
|---|---|---|
| *A63F 13/5255* | (2014.01) | |
| *A63F 13/42* | (2014.01) | |
| *A63F 13/213* | (2014.01) | |
| *A63F 13/211* | (2014.01) | |
| *A63F 13/25* | (2014.01) | |
| *G06T 13/40* | (2011.01) | |
| *H04L 29/06* | (2006.01) | |
| *A63F 13/24* | (2014.01) | |
| *G02B 27/01* | (2006.01) | |
| *G02B 27/00* | (2006.01) | |
| *G06F 3/01* | (2006.01) | |
| *G06F 3/0346* | (2013.01) | |
| *G06T 19/00* | (2011.01) | |

(52) U.S. Cl.
CPC .......... *A63F 13/213* (2014.09); *A63F 13/24* (2014.09); *A63F 13/25* (2014.09); *A63F 13/42* (2014.09); *A63F 13/5255* (2014.09); *G02B 27/0093* (2013.01); *G02B 27/017* (2013.01); *G06F 3/011* (2013.01); *G06F 3/017* (2013.01); *G06F 3/0346* (2013.01); *G06T 13/40* (2013.01); *H04L 67/38* (2013.01); *A63F 2300/8082* (2013.01); *G06T 19/006* (2013.01)

(58) Field of Classification Search
CPC .... A63F 13/213; A63F 13/42; A63F 13/5255; A63F 13/212; A63F 13/24; A63F 2300/8082; G02B 27/0093; G02B 27/017; G02B 2027/0187; G02B 2027/0138; G02B 2027/014; H04L 67/38; G06T 13/40; G06T 19/006

See application file for complete search history.

(56) References Cited

U.S. PATENT DOCUMENTS

| | | |
|---|---|---|
| 2007/0265088 A1 | 11/2007 | Nakada et al. |
| 2008/0076567 A1 | 3/2008 | Dohta |
| 2011/0183765 A1 | 7/2011 | Kobayashi et al. |
| 2011/0248992 A1* | 10/2011 | van Os ............... G06T 11/60 345/419 |
| 2012/0206574 A1 | 8/2012 | Shikata et al. |
| 2014/0186002 A1 | 7/2014 | Hanaya et al. |
| 2015/0258431 A1 | 9/2015 | Stafford et al. |
| 2015/0352437 A1 | 12/2015 | Koseki et al. |
| 2016/0239081 A1 | 8/2016 | Imoto et al. |
| 2016/0252729 A1* | 9/2016 | Doucet ............... A63F 13/95 345/8 |
| 2017/0024935 A1 | 1/2017 | Baba |
| 2017/0263058 A1 | 9/2017 | Muta |

FOREIGN PATENT DOCUMENTS

| | | |
|---|---|---|
| JP | 2008-67877 A | 3/2006 |
| JP | 2006-268676 A | 10/2006 |
| JP | 2007-301038 A | 11/2007 |
| JP | 2011-110156 A | 6/2011 |
| JP | 2011-152297 A | 8/2011 |
| JP | 2011-258158 A | 12/2011 |
| JP | 2012-169911 A | 9/2012 |
| JP | 2014-127987 A | 7/2014 |
| JP | 2015-231445 A | 12/2015 |
| JP | 2015-232783 A | 12/2015 |
| JP | 2016-158794 A | 9/2016 |
| JP | 2016-173698 A | 9/2016 |
| JP | 2016-202686 A | 12/2016 |
| JP | 2017-12397 A | 1/2017 |
| JP | 6058184 B1 | 1/2017 |
| WO | 2015/064165 A1 | 5/2015 |

OTHER PUBLICATIONS

Office Action in JP Application No. 2017-044038, dated Aug. 8, 2017, 6pp.
"Pokemon Battle Revolution", Nintendo Dream vol. 155, published Mar. 1, 2007, Mainichi communications, Japan, 14pp.
Notice of Allowance in JP Application No. 2017-044038, dated Nov. 17, 2017, 6pp.
Office Action in JP Application No. 2017-044043, dated Aug. 1, 2017, 4pp.
Notice of Allowance in JP Application No. 2017-044043, dated Oct. 24, 2017, 6pp.
Office Action in JP Application No. 2017-044046, dated Aug. 1, 2017, 7pp.
Office Action in JP Application No. 2017-044046, dated Oct. 24, 2017, 12pp.

* cited by examiner

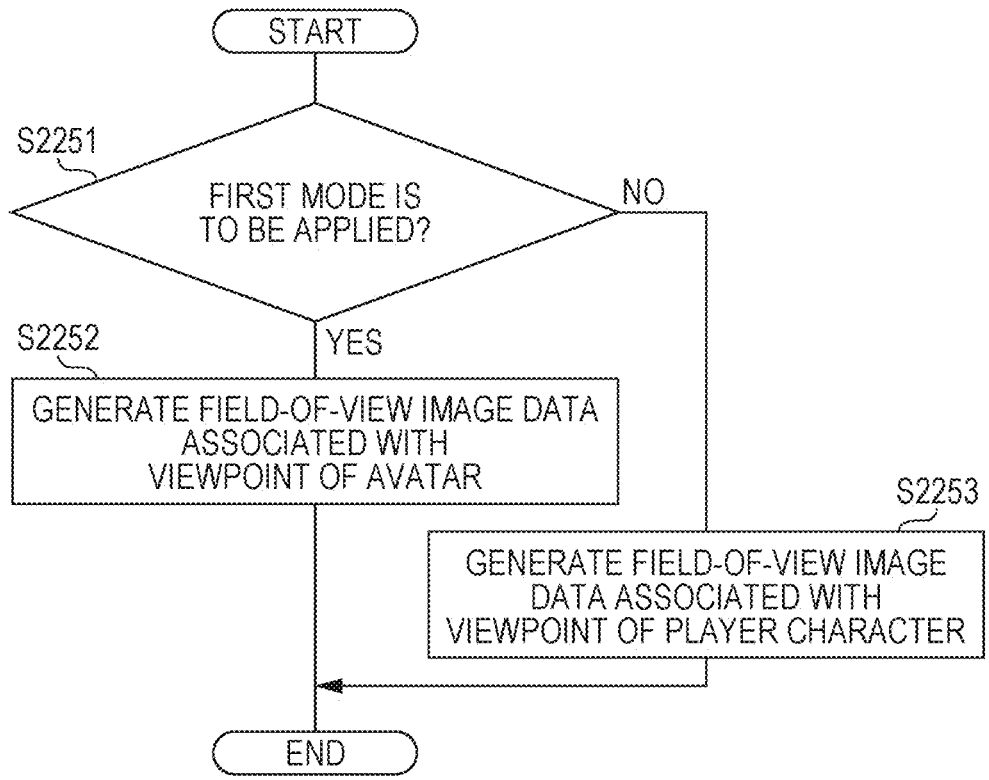
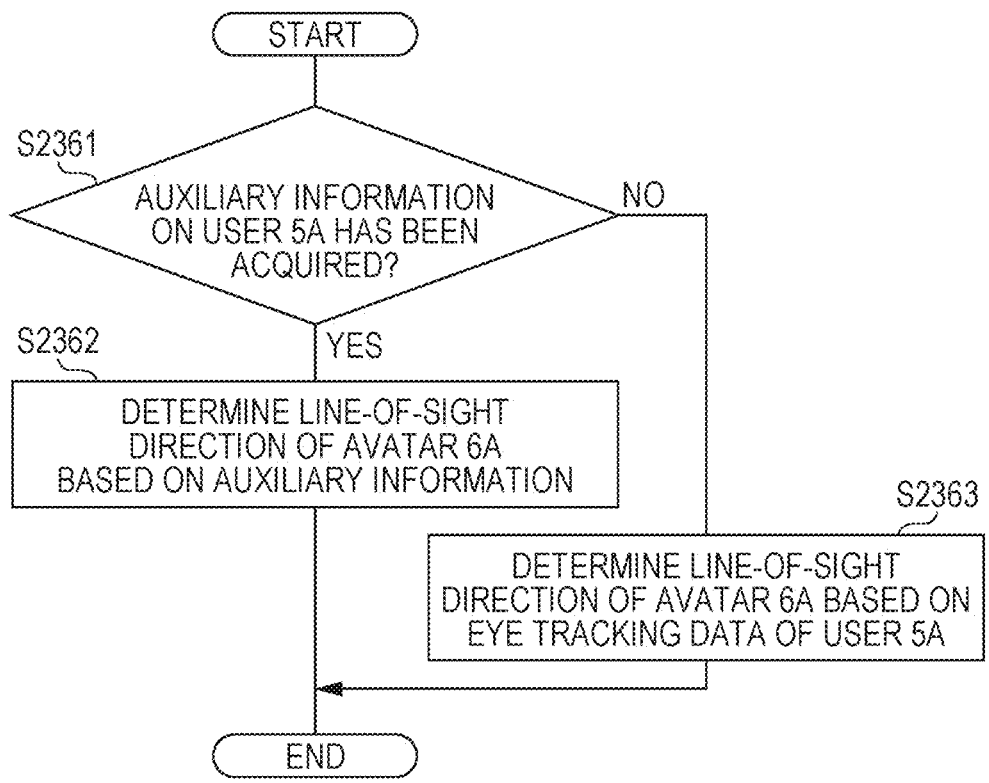

INFORMATION PROCESSING METHOD AND APPARATUS FOR EXECUTING THE INFORMATION PROCESSING METHOD

RELATED APPLICATIONS

The present application is a continuation of U.S. patent application Ser. No. 16/289,593 filed Feb. 28, 2019, which is a continuation of U.S. patent application Ser. No. 15/915,955 filed Mar. 8, 2018, which claims priority to Japanese Application Nos. 2017-044038, 2017-044043 and 2017-044046, all filed on Mar. 8, 2017. The disclosures of the above-listed applications are hereby incorporated by reference herein in their entirety.

TECHNICAL FIELD

This disclosure relates to an information processing method and apparatus for executing the information processing method.

BACKGROUND

PlayStation (trademark) VR is known as hardware for providing a game experience (VR game) in a virtual space to a user (see Non-Patent Document 1). In PlayStation VR, the user can play a VR game by operating a player character or the like in the virtual space by using, for example, a controller that can be held in both hands. Technology for playing a VR game using a controller is also described in Patent Documents 1 and 2.

Patent Document

[Patent Document 1] Japanese Patent Application Laid-open No. 2015-232783
[Patent Document 2] Japanese Patent Application Laid-open No. 2016-158794

Non-Patent Documents

[Non-Patent Document 1] "PlayStation (trademark) VR|PlayStation (trademark) Official Site", [online], SONY, [retrieved on Feb. 8, 2017], Internet <https://www.youtube.com/watch?v=NCpNKLXovtE>

SUMMARY

According to at least one aspect of this disclosure, there is provided a method including defining a virtual space, the virtual space including a first avatar, a first character, a second avatar, and a second character, the first avatar being associated with the first user, the first character being operated in accordance with input to a first controller operated by the first user in a real space, the second avatar being associated with a second user, the second character being operated in accordance with input to a second controller operated by the second user in the real space. The method further includes defining a plurality of operation modes for operating the virtual space, the plurality of operation modes including a first mode and a second mode; moving, in accordance with an operation of the virtual space by the first user being executed in the first mode, the first character in accordance with the input to the first controller. The method further includes moving, in accordance with an operation of the virtual space by the first user being executed in the second mode, the first avatar based on the input to the first controller. The method further includes defining a visual field in the virtual space in accordance with a motion of a head-mounted device (HMD) associated with the first user. The method further includes generating a visual-field image in accordance with the visual field. The method further includes displaying the visual-field image on the HMD.

BRIEF DESCRIPTION OF THE DRAWINGS

FIG. 22 A flowchart of processing according to at least one embodiment of this disclosure.

FIG. 23 A flowchart of processing by an HMD set according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
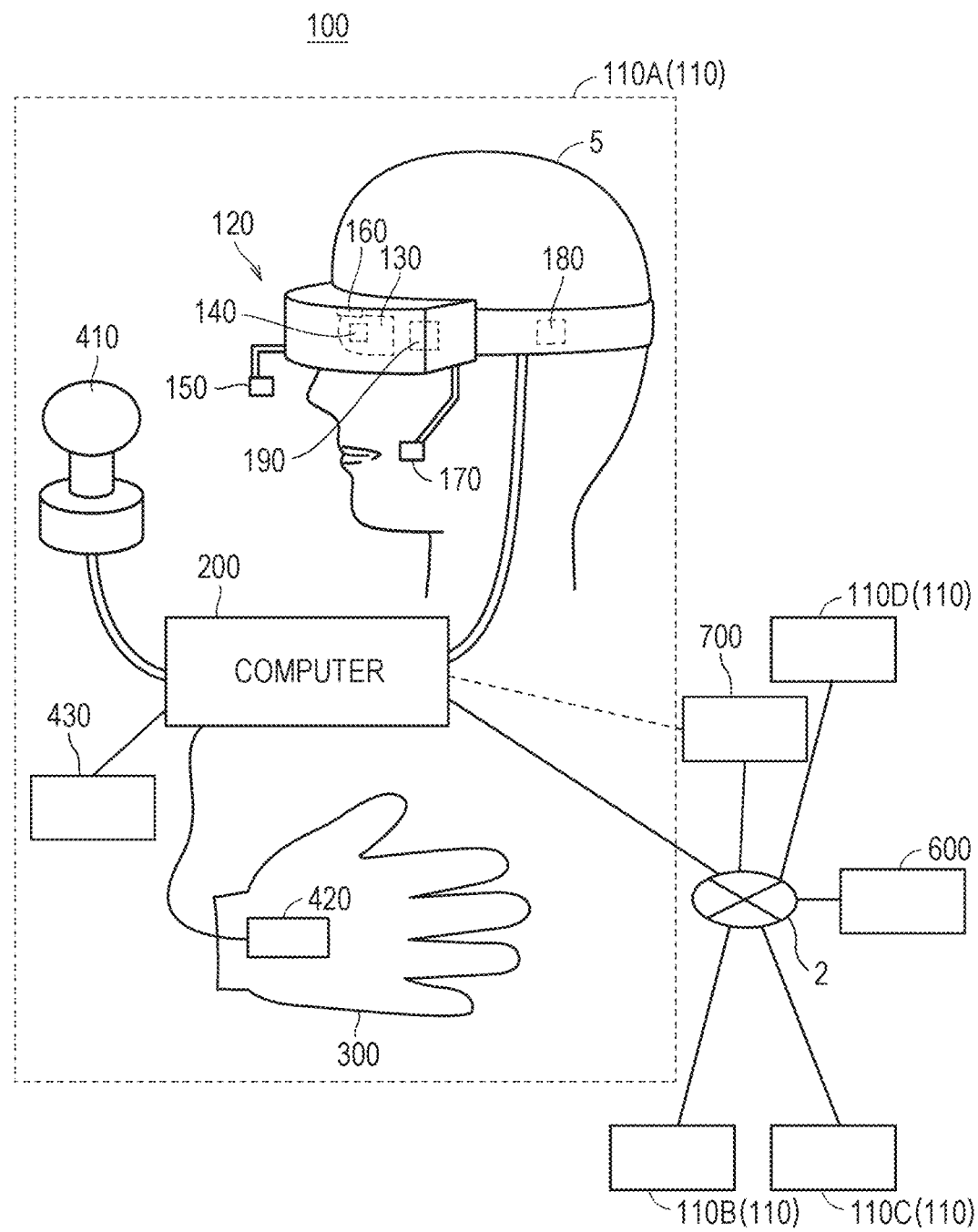
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
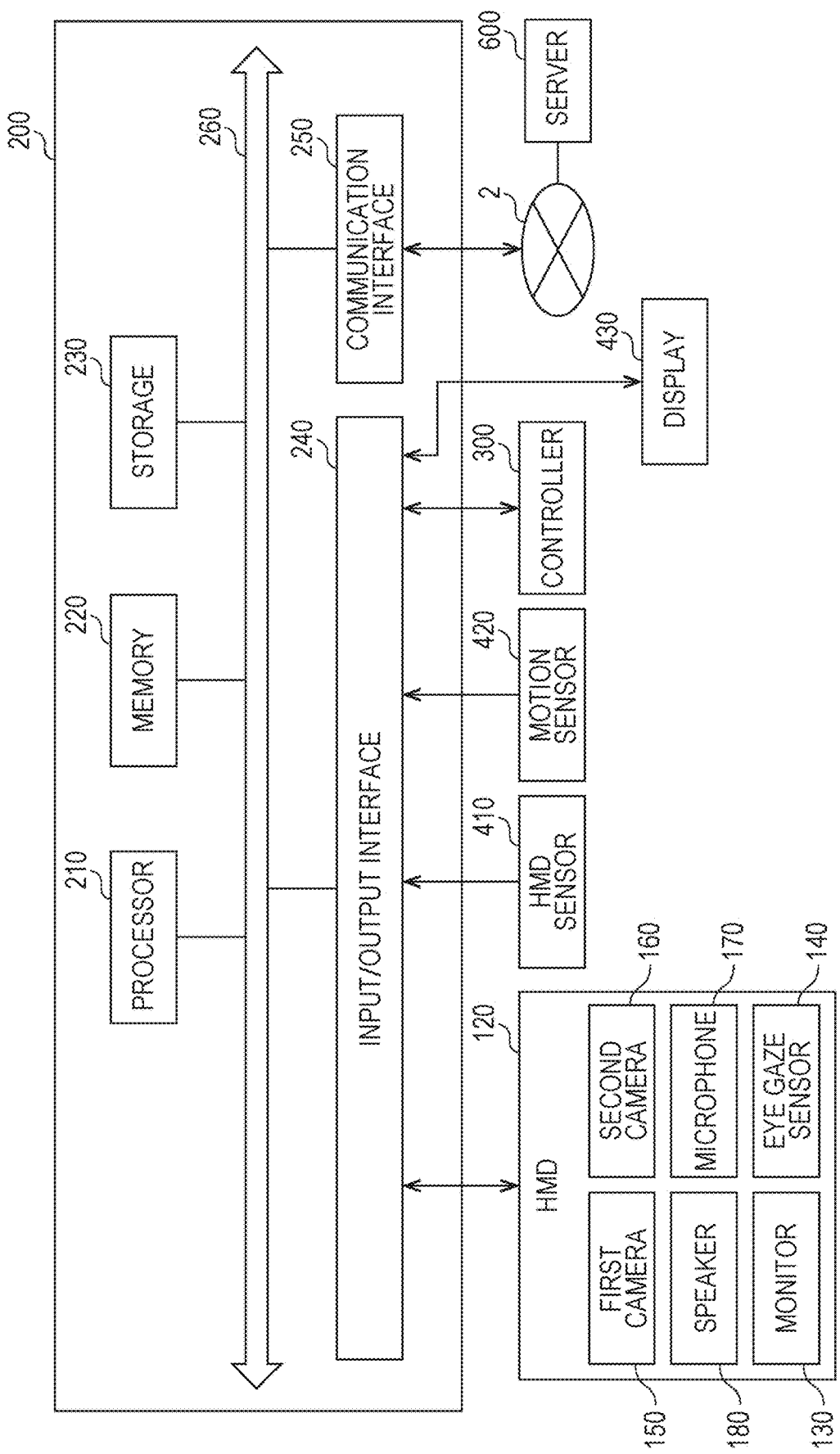
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth (R), near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
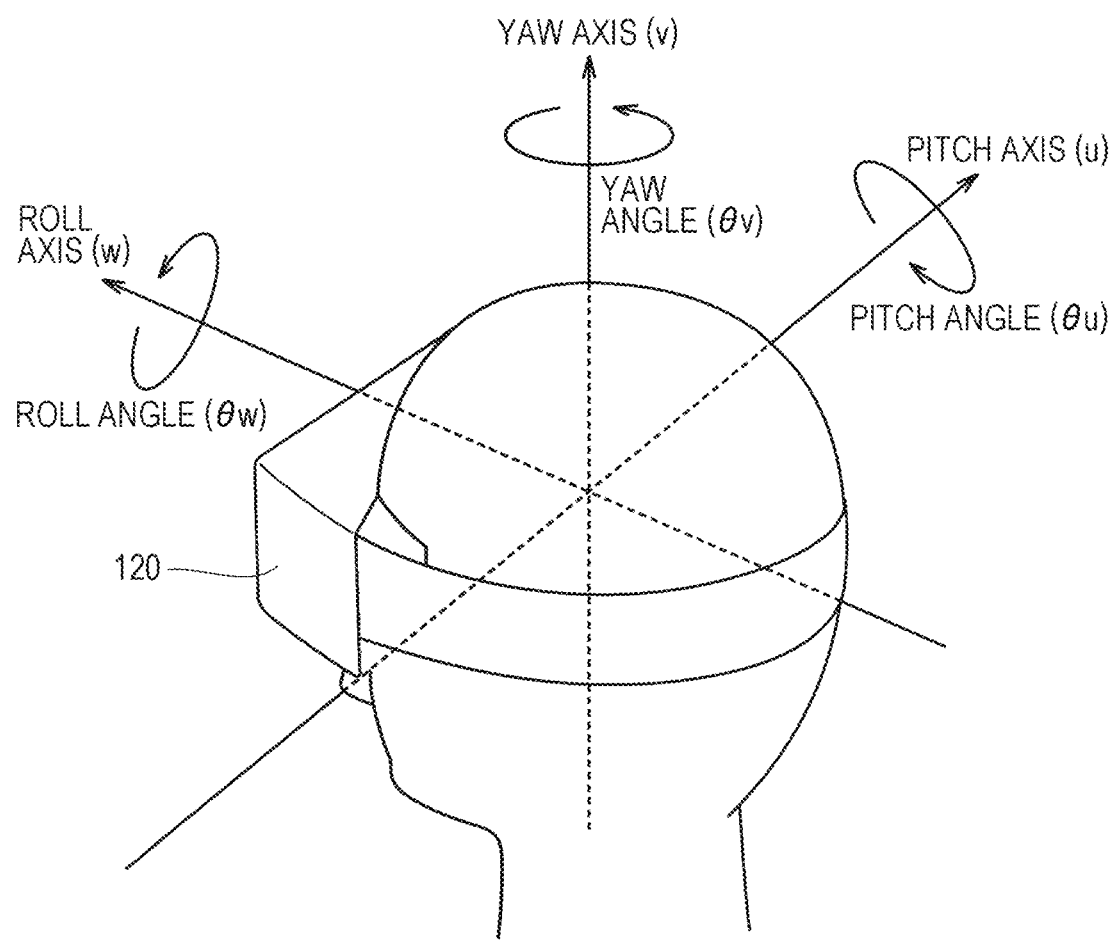
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle (θu), a yaw angle (θv), and a roll angle (θw) of the HMD 120 in the uvw visual-field coordinate system. The pitch angle (θu) represents an inclination angle of the HMD 120 about the pitch axis in the uvw visual-field coordinate system. The yaw angle (θv) represents an inclination angle of the HMD 120 about the yaw axis in the uvw visual-field coordinate system. The roll angle (θw) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
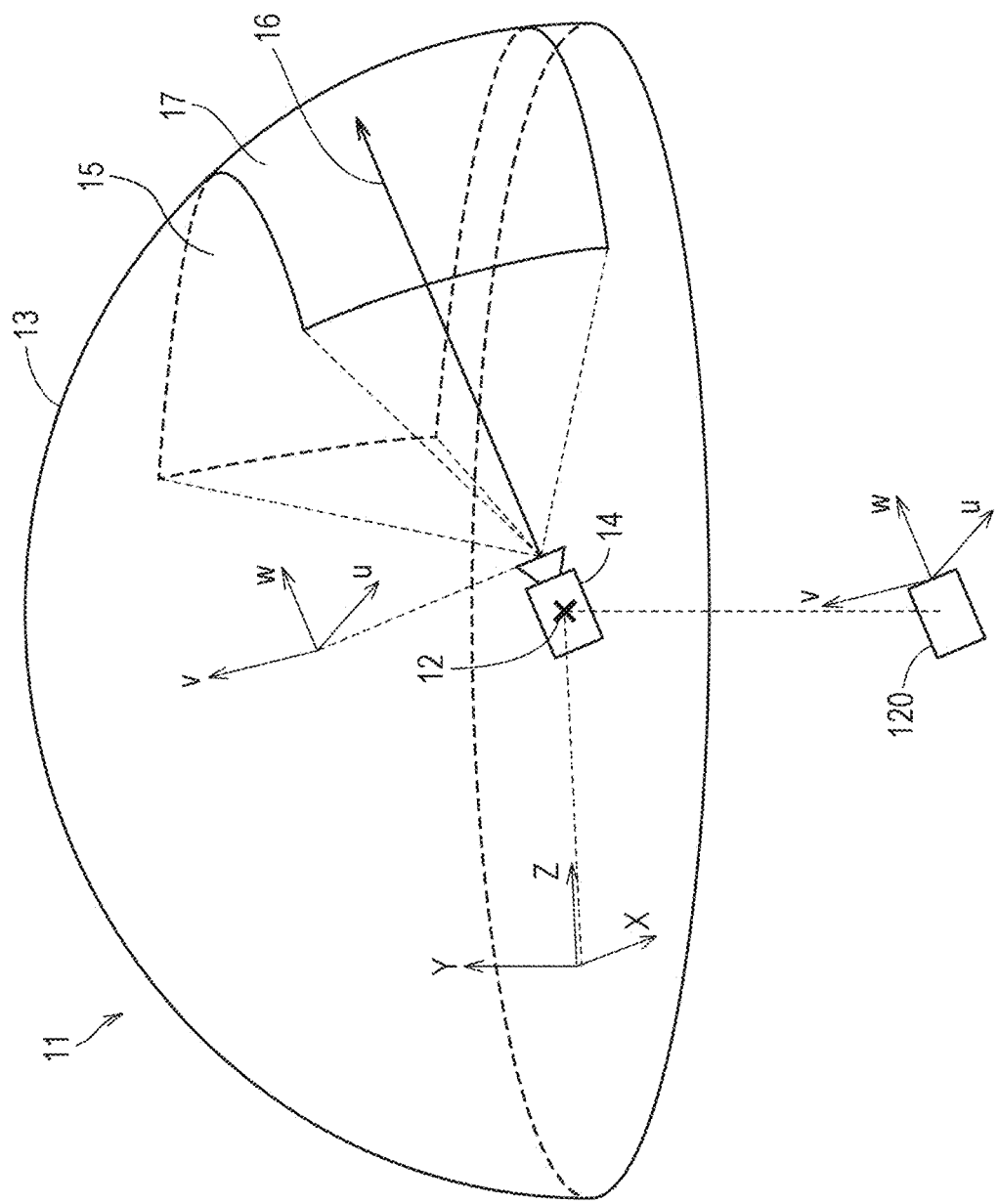
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
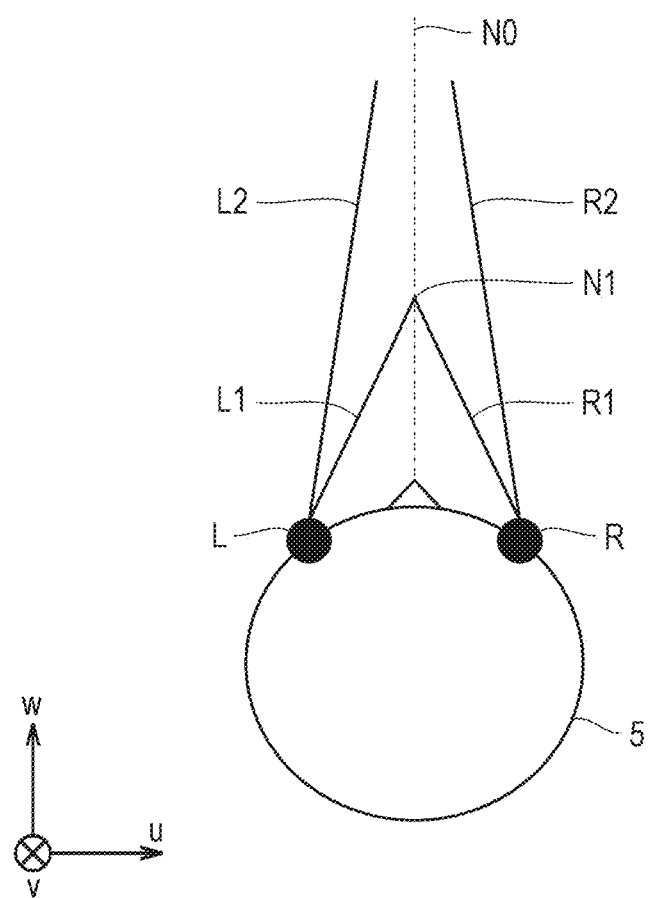
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
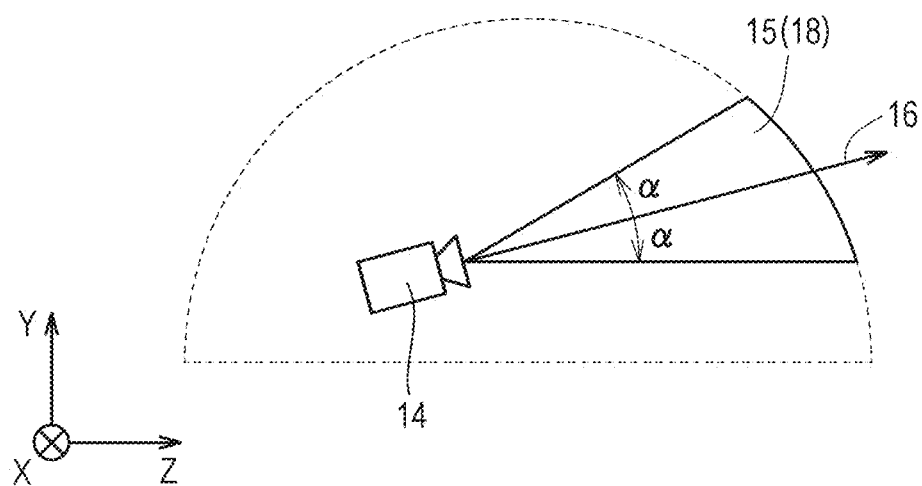
FIG. 6 A diagram of a YZ cross section obtained by viewing a field-of-view region from an X direction in the virtual space according to at least one embodiment of this disclosure.
Figure 7:
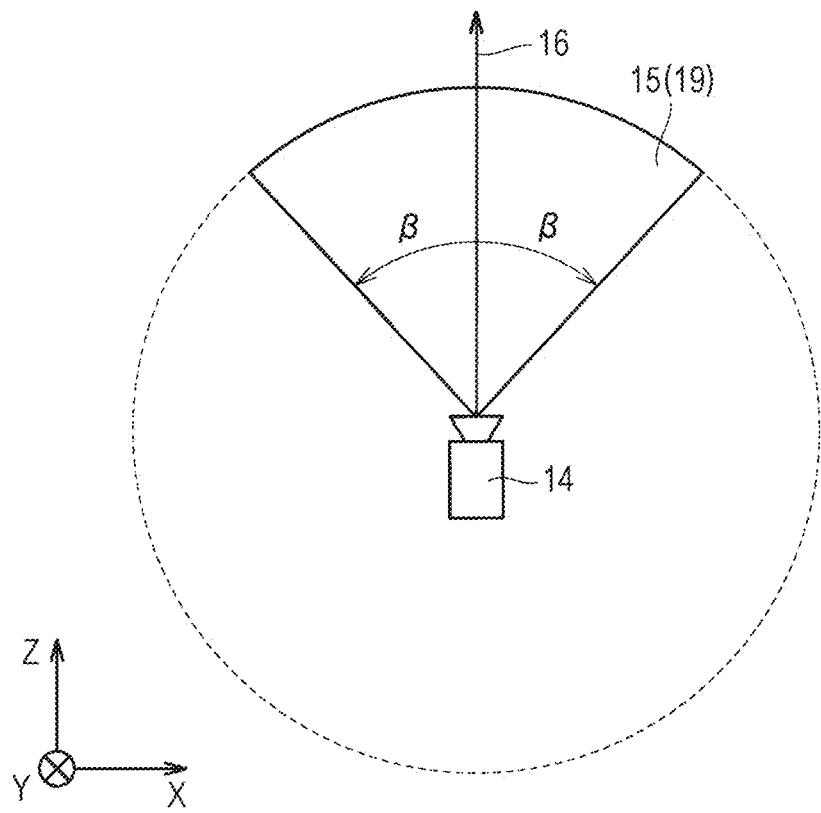
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle $\alpha$ from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth $\beta$ from the reference line of sight 16 serving as the center in the virtual space 11 as the region 19. The polar angle $\alpha$ and $\beta$ are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
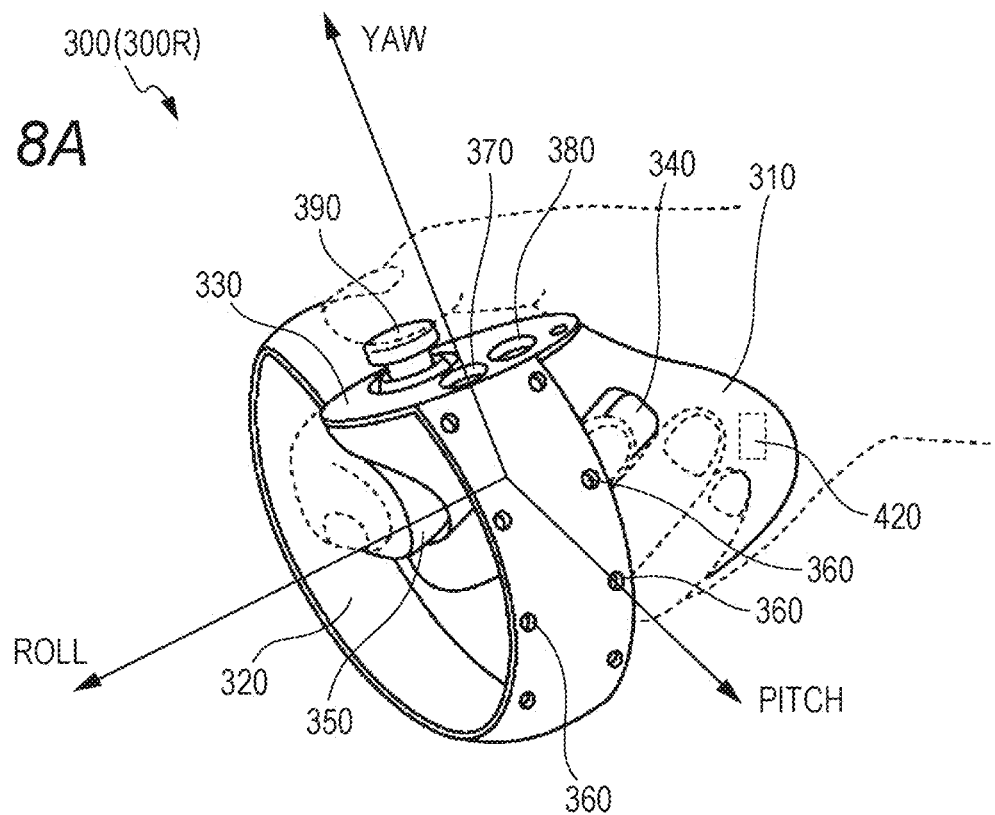
FIG. 8A A diagram of a schematic configuration of a controller according to at least one embodiment of this disclosure.
Figure 8B:
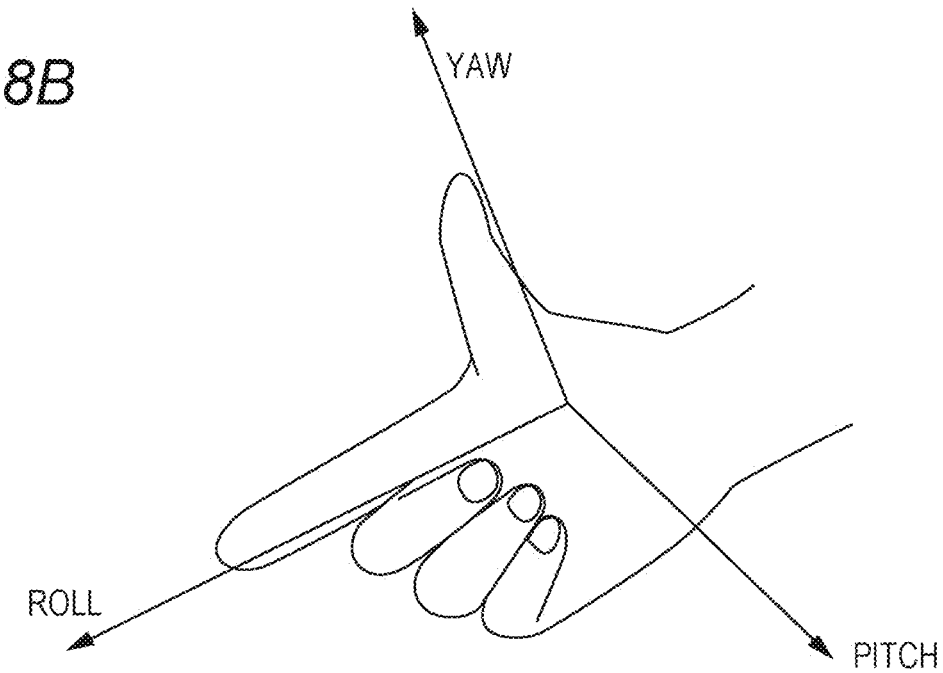
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

Figure 9:
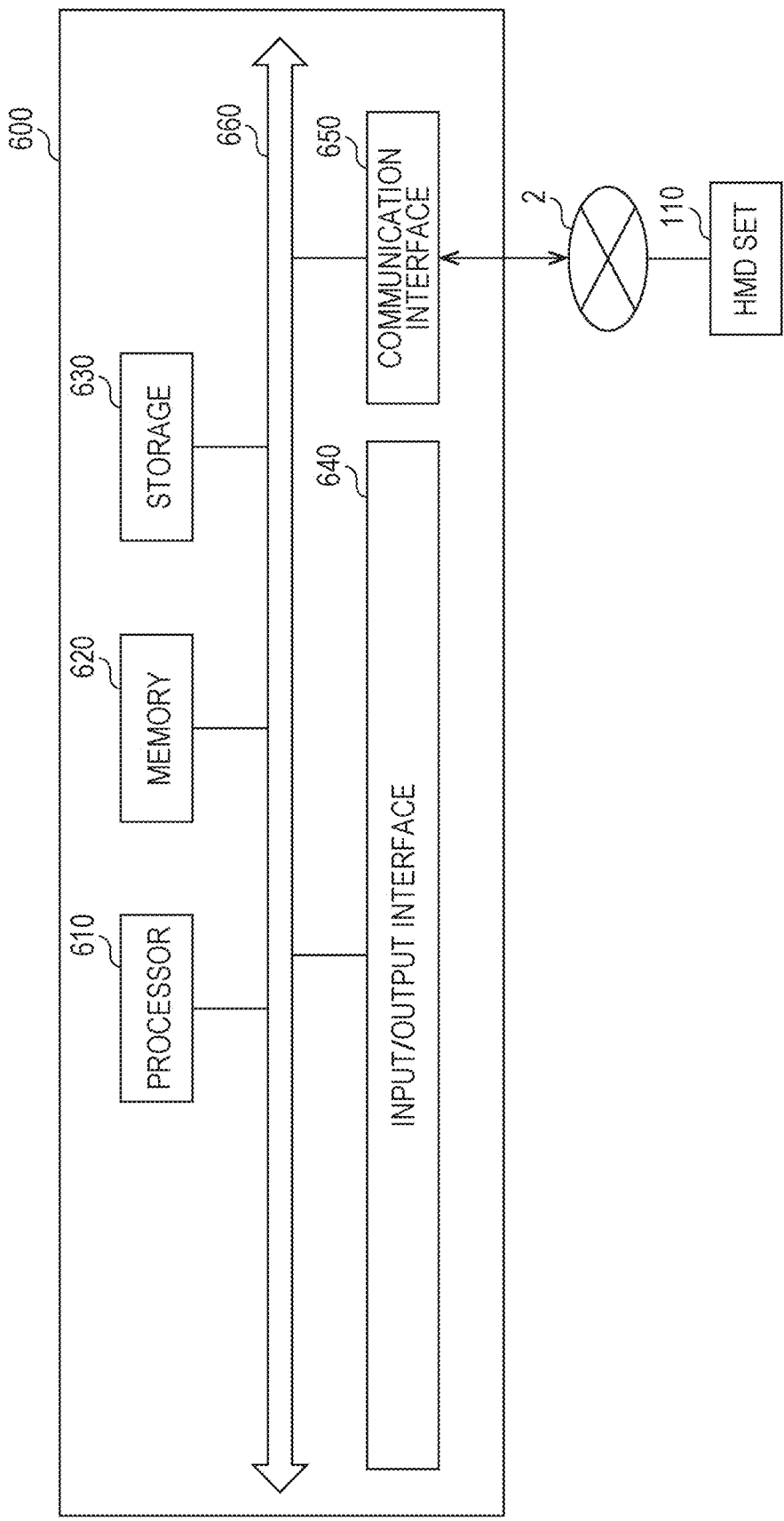
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
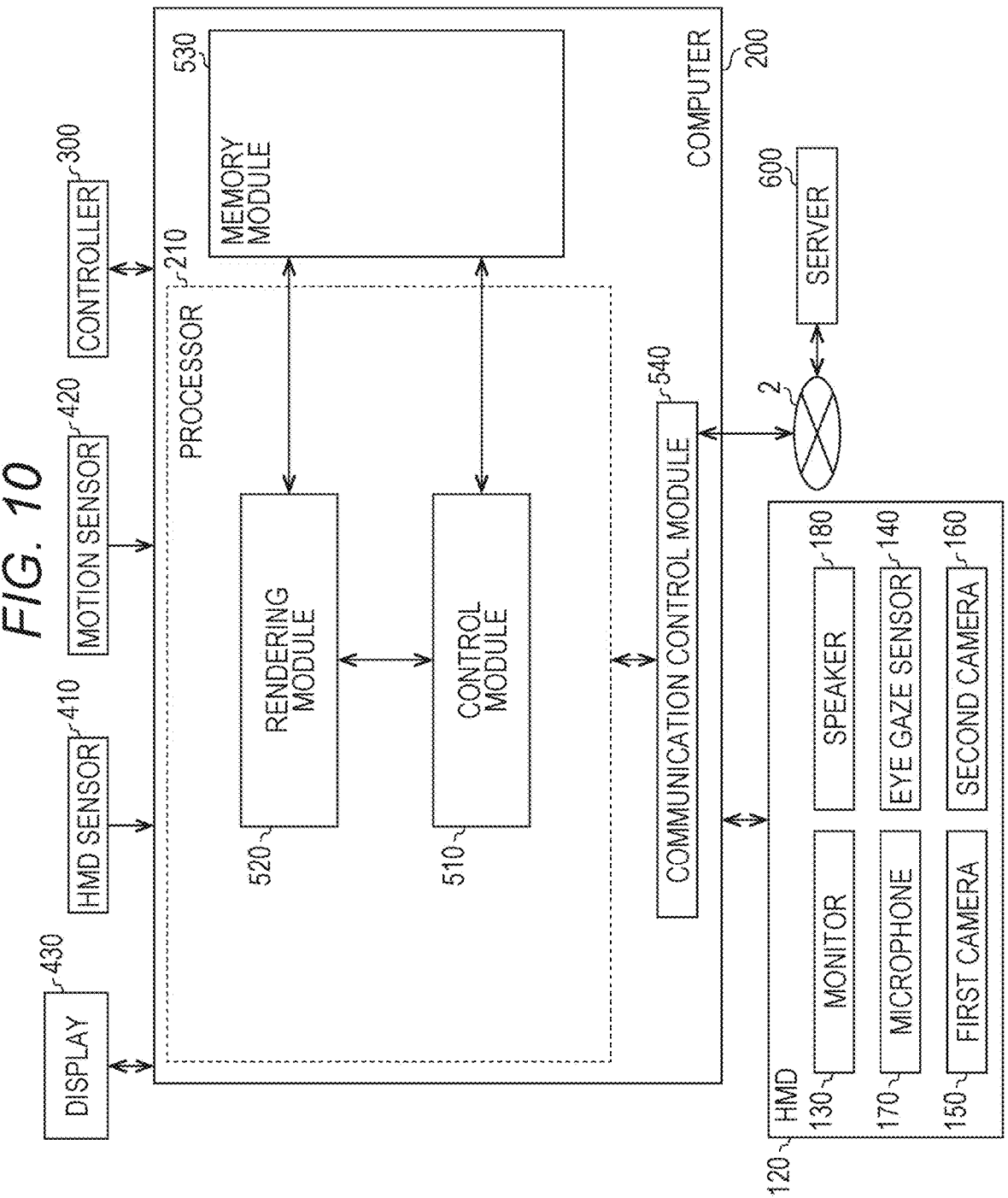
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity (R) provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
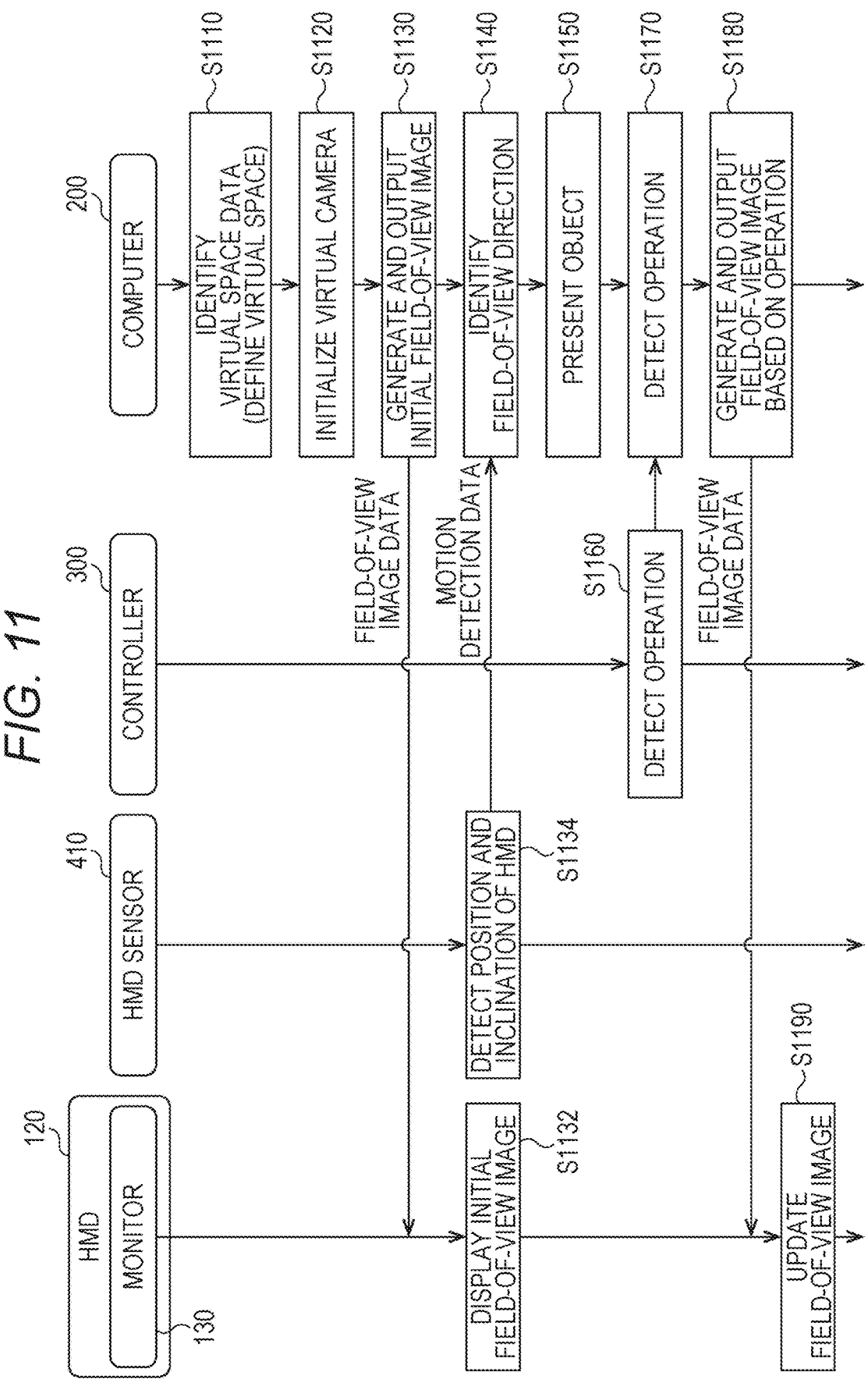
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
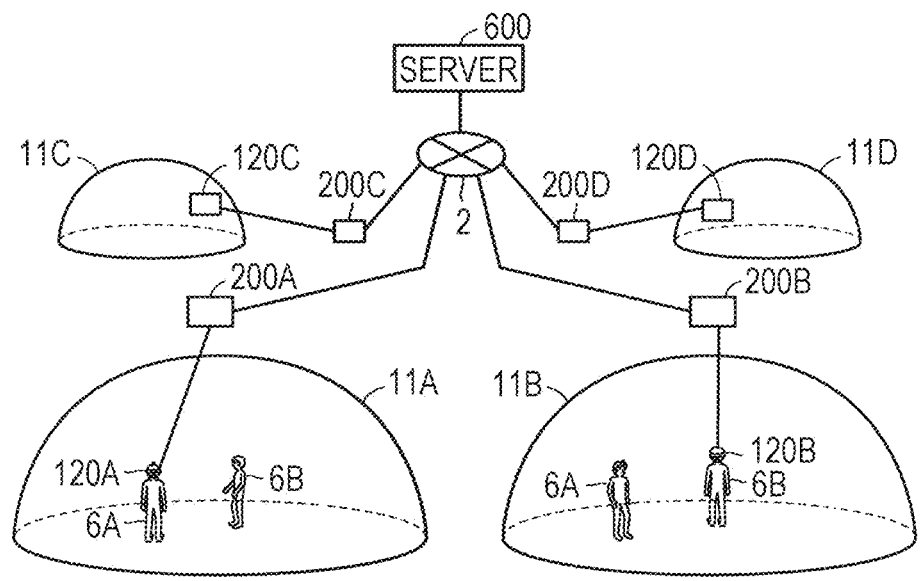
FIG. 12A A schematic diagram of HMD systems of several users sharing the virtual space interact using a network according to at least one embodiment of this disclosure.
Figure 12B:
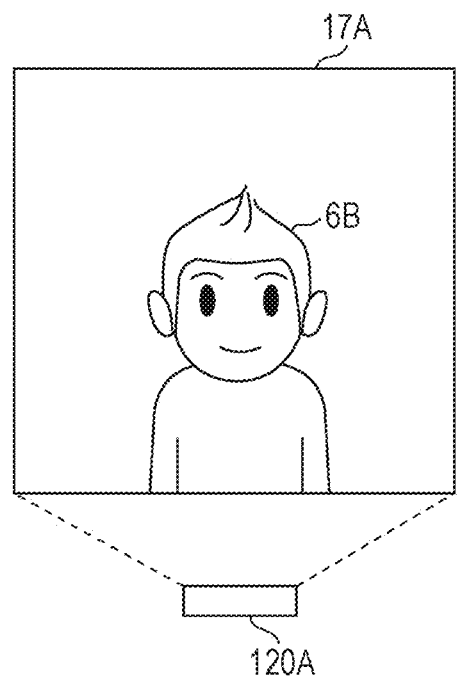
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
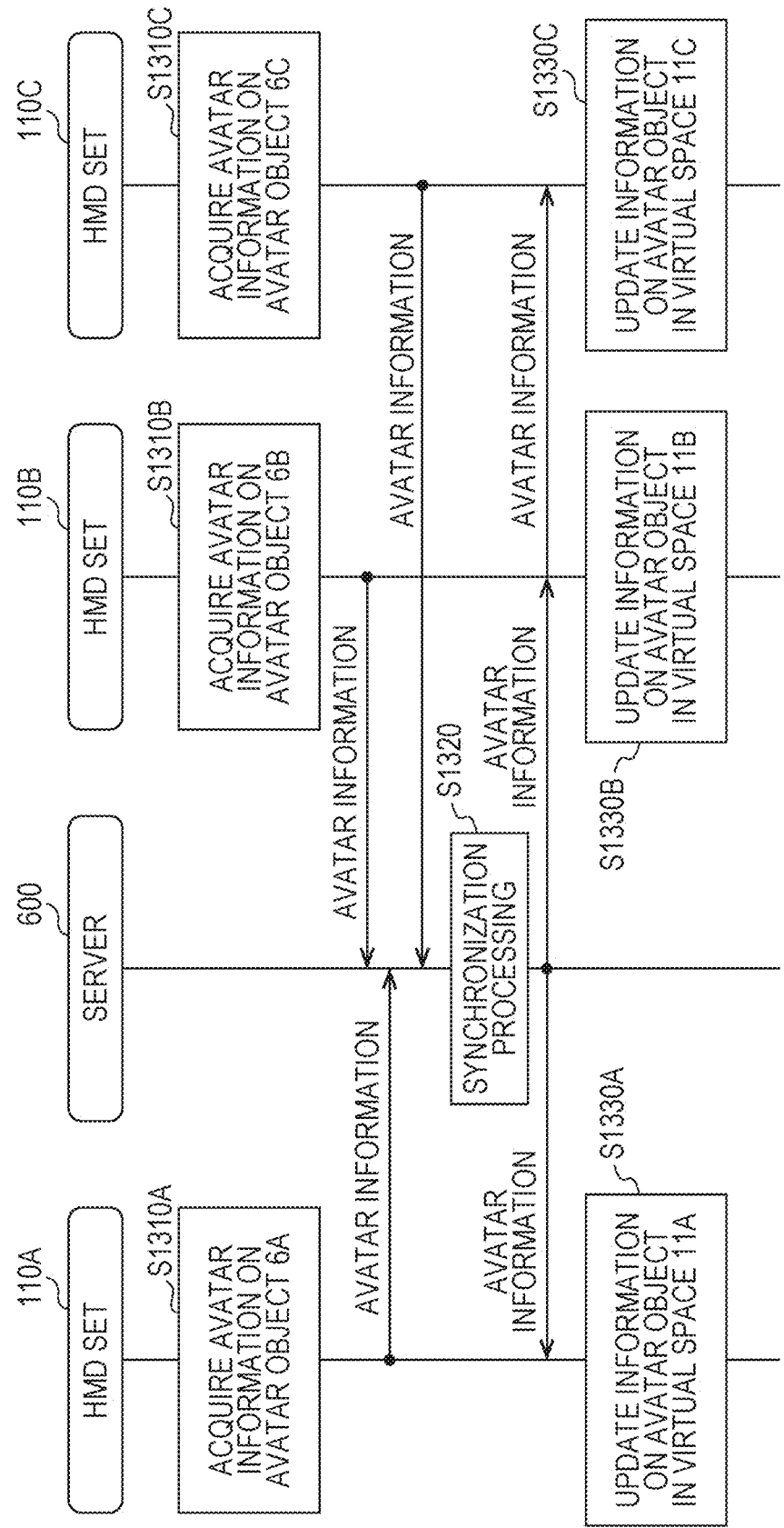
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110 acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Controller]

Figure 14A:
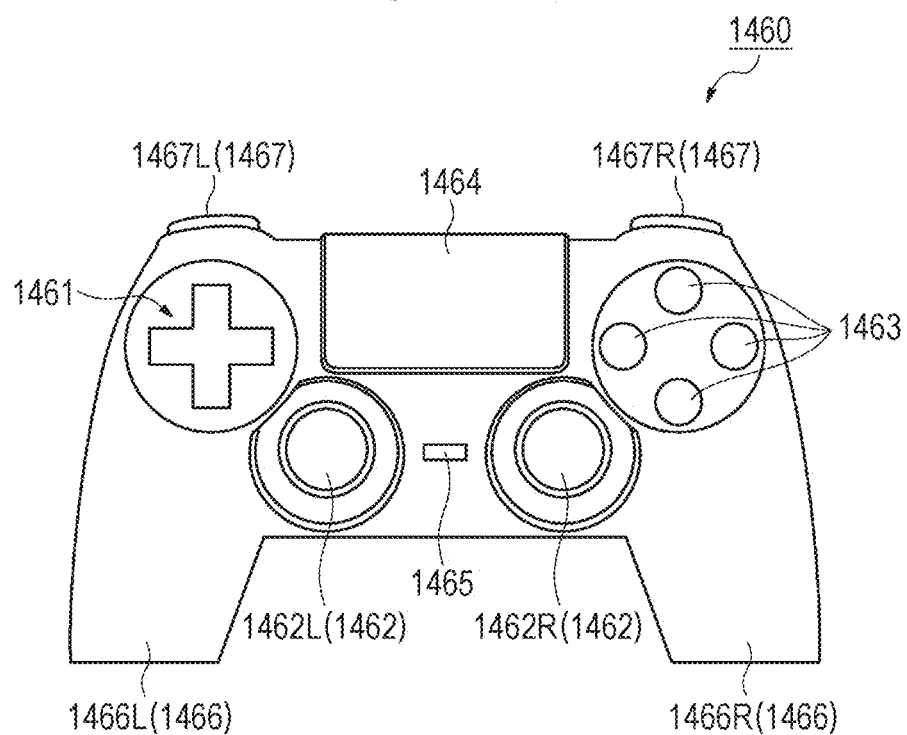
FIG. 14A A diagram of a schematic configuration of a controller according to at least one embodiment of this disclosure.
Figure 14B:
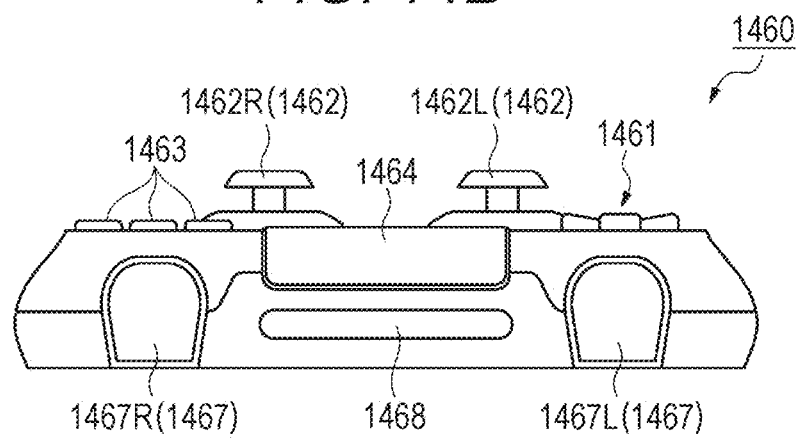
FIG. 14B A diagram of a schematic configuration of the controller according to at least one embodiment of this disclosure.

An example of a controller 1460, which is different from the controller 300, is now described with reference to FIG. 14A and FIG. 14B. FIG. 14A and FIG. 14B are each a diagram of a schematic configuration of the controller 1460 according to at least one embodiment of this disclosure. In FIG. 14A, there is an external configuration of an upper surface of the controller 1460. In FIG. 14B, there is an external configuration of a side surface on the far side of the controller 1460. In this case, the upper surface of the controller 1460 is the surface that faces the user 5 when the user 5 holds the controller 1460 with both hands.

In FIG. 14A, a direction key 1461, analog sticks 1462L and 1462R, four types of operation buttons 1463, a touch pad 1464, a function button 1465, and the like are arranged on the upper surface of the controller 1460 as input portions. The controller 1460 has grip portions 1466 for the user 5 to grip the controller 1460. The grip portions 1466 include a left grip portion 1466L to be gripped by the left hand of the user 5 and a right grip portion 1466R to be gripped by the right hand of the user 5. In FIG. 14B, on the side surface on the far side of the controller 1460, there are arranged upper buttons 1467L and 1467R as input portions, and a light emitting portion 1468 for emitting light based on instruction information and the like transmitted from the controller 1460.

The touch pad 1464 is arranged between the direction key 1461 and the operation buttons 1463. The function button 1465 is arranged between the left and right analog sticks 1462L and 1462R. The function button 1465 may be used, for example, to activate the controller 1460 or to activate a communication connection between the controller 1460 and the computer 200. The other input portions (direction key 1461, analog sticks 1462, operation buttons 1463, and upper buttons 1467) may be used for operation of avatars and player characters, which are described later, for example. In at least one embodiment, the term "avatar" is synonymous with "avatar object". For example, in at least one aspect, the analog sticks 1462 receive an operation in an arbitrary 360-degree direction from an initial position (neutral position). The operation may include, for example, an operation for moving an object arranged in the virtual space 11.

The direction key 1461 and the analog stick 1462L are arranged based on the assumption of receiving operations by the thumb of the left hand of the user 5. The operation buttons 1463 and the analog stick 1462R are arranged based on the assumption of receiving operations by the thumb of the right hand of the user 5. The upper button 1467L is arranged based on the assumption of receiving operations by the index finger of the left hand of the user 5. The upper button 1467R is arranged based on the assumption of receiving operations by the index finger of the right hand of the user 5. However, the shape of the controller 1460, the arrangement configuration of each portion, and the function of each portion are not limited to the example described above. For example, the number of operation buttons 1463 may be a number other than four (e.g., two), and the analog sticks 1462L and 1462R may be omitted.

In at least one aspect, the controller 1460 includes a battery for driving the light emitting portion 1468 and other members. The battery includes, for example, a rechargeable battery, a button battery, or a dry battery, but the battery is not limited thereto. In at least one aspect, the controller 1460 may be connected to a USB interface of the computer 200, for example. In this case, the controller 1460 does not require a battery.

[Details of Module Configuration]

Figure 15:
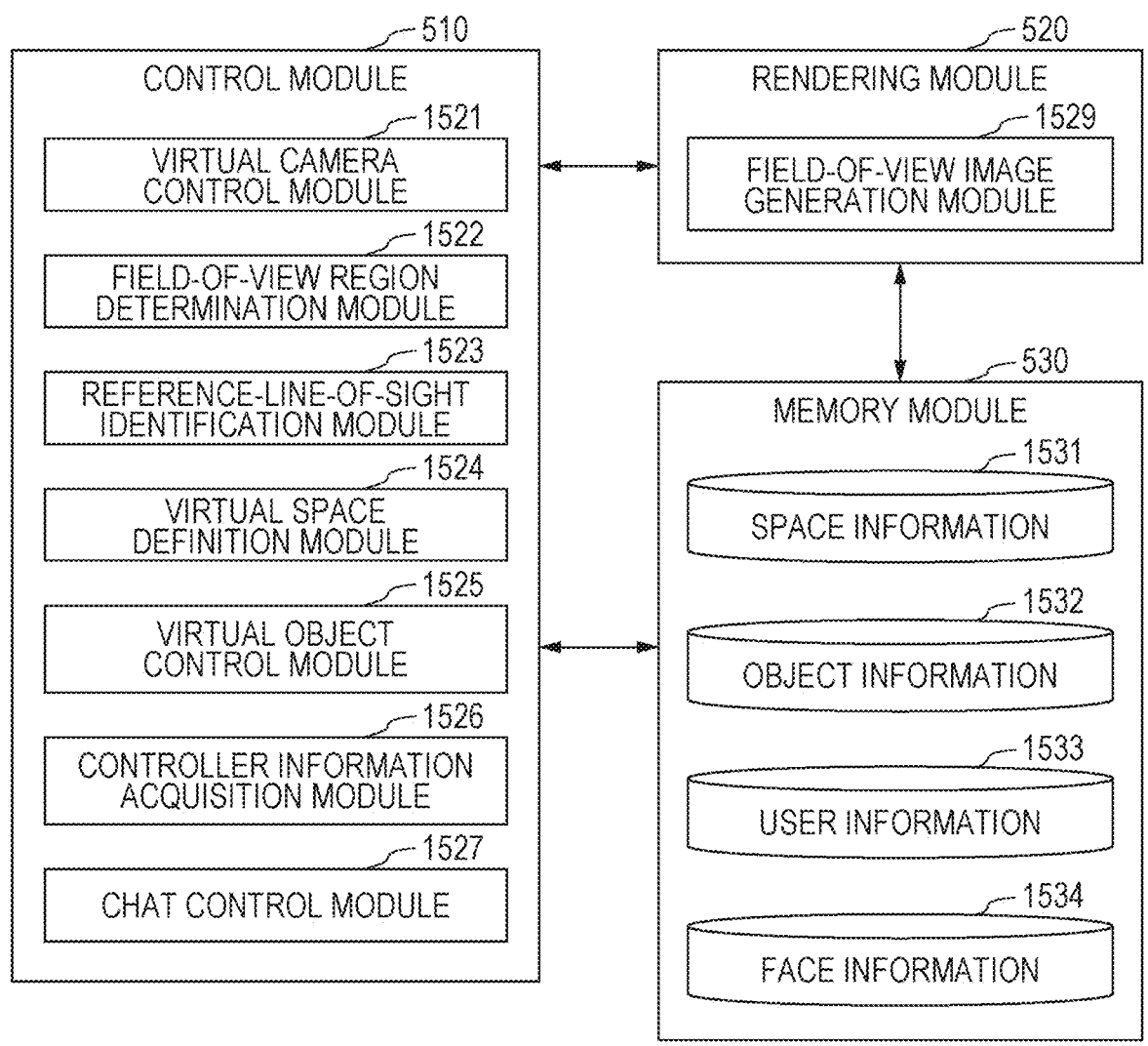
FIG. 15 A block diagram of a module configuration of the computer according to at least one embodiment of this disclosure.

With reference to FIG. 15, details of a module configuration of the computer 200 are described. FIG. 15 is a block diagram of a module configuration of the computer 200 according to at least one embodiment of this disclosure.

In FIG. 15, the control module 510 includes a virtual camera control module 1521, a field-of-view region determination module 1522, a reference-line-of-sight identification module 1523, a virtual space definition module 1524, a virtual object control module 1525, a controller information acquisition module 1526, and a chat control module 1527. The rendering module 520 includes a field-of-view image generation module 1529. The memory module 530 stores space information 1531, object information 1532, user information 1533, and face information 1534.

In at least one aspect, the control module 510 controls the image display on the monitor 130 of the HMD 120. The virtual camera control module 1521 arranges the virtual camera 14 in the virtual space 11, and controls the behavior, the direction, and the like of the virtual camera 14. The field-of-view region determination module 1522 defines the field-of-view region 15 in accordance with the direction of the head of the user wearing the HMD 120. The field-of-view image generation module 1529 generates the field-of-view image to be displayed on the monitor 130 based on the determined field-of-view region 15. The reference line-of-sight identification module 1523 identifies the line of sight of the user 5 based on the signal from the eye gaze sensor 140.

The control module 510 controls the virtual space 11 to be provided to the user 5. The virtual space defining module 1524 generates virtual space data representing the virtual space 11 to define the virtual space 11 in the HMD set 110.

The virtual object control module 1525 generates, based on the object information 1532, which is described later, a target object to be arranged in the virtual space 11. The virtual object control module 1525 controls the motion (e.g., movement and state change) of the target object in the virtual space 11. The virtual object control module 1525 controls the motion (e.g., movement and state change) of the avatar and the player character based on controller information and the like acquired by the controller information acquisition module 1526, which is described later. The target object may be, for example, an animal or a landscape including forests, mountains, and the like, to be arranged in accordance with the progress of the game story. The avatar is an object associated with the user wearing the HMD 120. The avatar is an object that serves as an alter ego of the user in the virtual space 11. On the other hand, the player character is a character object operated by the user in the game developed in the virtual space 11. In at least one embodiment, the game to be developed in the virtual space 11 is a competitive game in which a plurality of users fight each player character on a game field (e.g., a battle field) prepared in the virtual space 11 (or is, for example, an action game in which a plurality of users progress by cooperating with each other). The avatar is a humanoid object, and the player character is an object imitating an animal. However, the player character may also take an appropriate form in accordance with the content of the game to be developed in the virtual space 11. For example, the player character may be a humanoid object, or may be an object imitating a non-biological object, for example, a robot. More specifically, when the game to be developed in the virtual space 11 is a racing game using a radio-controlled car, the player character may be an object representing the radio-controlled car.

The controller information acquisition module 1526 acquires controller information including state information for identifying the state of the controller 1460 and operation information indicating the content of the input operation by the user 5 to the controller 1460. The state information is, for example, information for identifying the position and inclination of the controller 1460 detected by the HMD sensor 410 or the like. The controller information is delivered to the virtual object control module 1525 in order to translate the state of the controller 1460 and the content of the input operation on the controller 1460 in the avatar or the player character in the virtual space 11. The controller information acquisition module 1526 also delivers controller information on other users acquired via the chat control module 1527, which is described later, to the virtual object control module 1525 as appropriate. As a result, the avatar or the player character associated with another user may be made to move based on the controller information on that another user.

The chat control module 1527 performs control for chatting with the avatar of another user staying in the same virtual space 11. For example, the chat control module 1527 transmits data necessary for chatting via the virtual space 11 (e.g., sound data input to microphone 170) to the server 600. The chat control module 1527 outputs the sound data of another user received from the server 600 to a speaker (not shown). As a result, sound-based chat is implemented. The chat control module 1527 transmits and receives the data to be shared among other users to and from the HMD set 110 of the other users via the server 600. The data to be shared may be, for example, motion information for controlling the motion of a part of the body of the avatar, controller information for controlling the motion of the player character, and the like. The motion information is, for example, information for identifying the position and inclination of the HMD 120 detected by the HMD sensor 410 or the like (hereinafter referred to as "direction data"), and eye tracking data detected by the eye gaze sensor 140 or the like. In at least one embodiment, the chat control module 1527 transmits and receives information including sound data, motion information, and controller information (hereinafter referred to as "avatar/character information") as information to be shared among the users to and from the HMD sets 110 of the other users via the server 600. The transmission and reception of the avatar/character information is implemented by utilizing the function of the communication control module 540, which is described later.

The space information 1531 stores one or more templates defined in order to provide the virtual space 11. The object information 1532 includes, for example, content to be played in the virtual space 11 and information for arranging an object to be used in the content in the virtual space 2. Examples of the content may include a game and content representing a landscape similar to that of the real society. The object information 1532 also includes rendering information for rendering each object (e.g., target object and avatar). The object information 1532 may also include attribute information indicating an attribute associated with each object. Examples of the attribute information on the target object include information indicating whether the target object is a movable object or a fixed object. The user information 1533 includes, for example, a program for causing the computer 200 to function as a control device of the HMD set 110, an application program for using each piece of content stored in the object information 1532, and the like.

[Control Structure]

Figure 16:
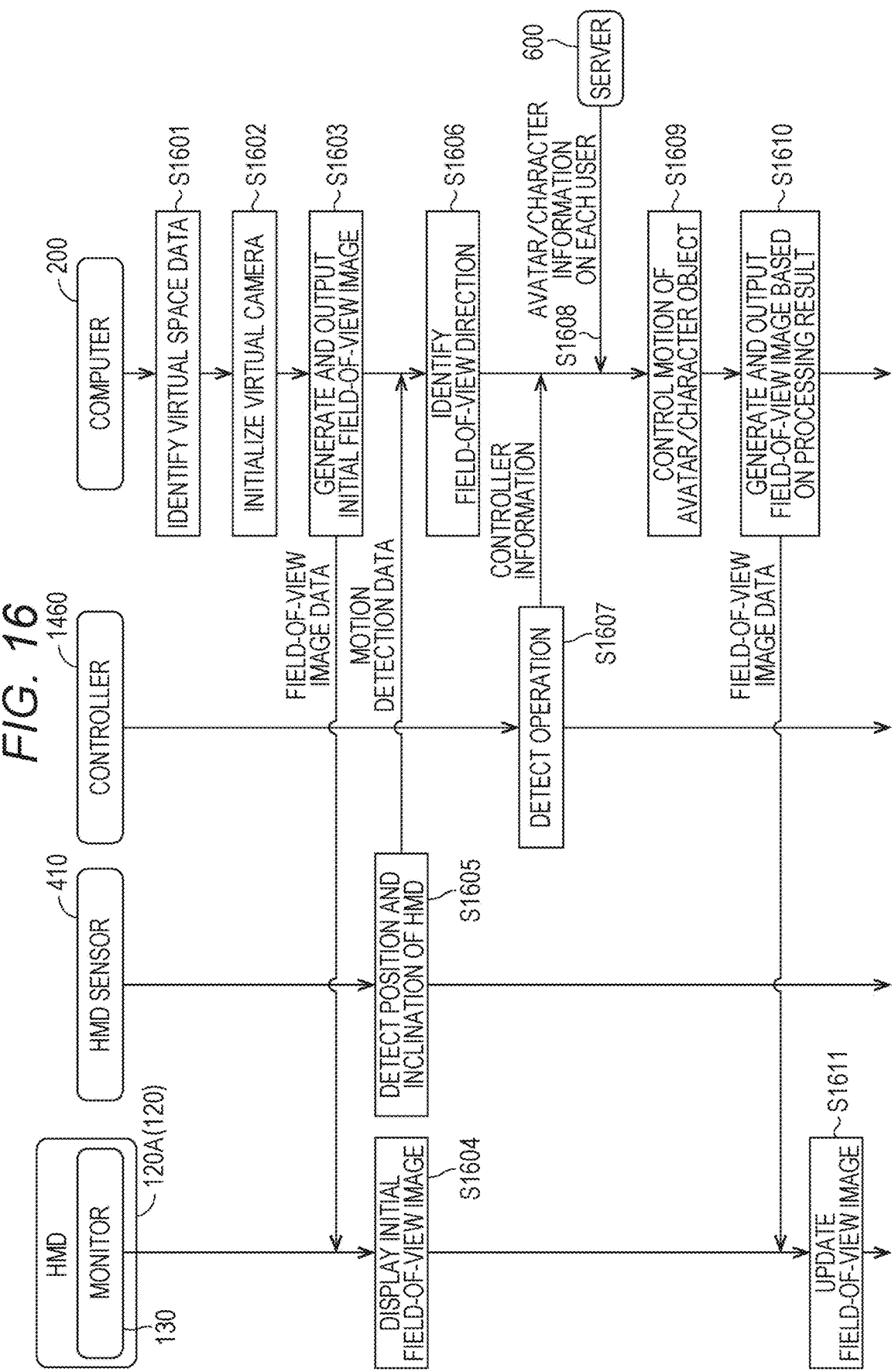
FIG. 16 A flowchart of processing to be executed by an HMD set according to at least one embodiment of this disclosure.

The control structure of the computer 200 in at least one embodiment of this disclosure is now described with reference to FIG. 16. FIG. 16 is a flowchart of processing to be executed by the HMD system 110A used by the user 5A (first user) in order to provide the user 5A with the virtual space 11 according to at least one embodiment of this disclosure.

In Step S1601, the processor 210 of the computer 200 serves as the virtual space definition module 1524 to identify the virtual space image data, and acquire the virtual space data defining the virtual space 11. In this case, the processor 210 can generate the virtual space data defining the virtual space 11 including the avatar and the player character of another user sharing the virtual space 11 by receiving from the server 600 or the like information on the initial arrangement and the like of the avatar and the player character of that another user. Alternatively, the virtual space data defining the virtual space 11 shared by a plurality of users may be generated by the server 600 communicably connected to each HMD set 110. In this case, the processor 210 may acquire the virtual space data by downloading the virtual space data from the server 600.

In Step S1602, the processor 210 serves as the virtual camera control module 1521 to initialize the virtual camera 14. For example, in a work area of the memory, the processor 210 arranges the virtual camera 14 at the center point (or another default position defined in advance) defined in advance in the virtual space 11, and matches the line of sight of the virtual camera 14 with the direction in which the user 5 is facing.

In Step S1603, the processor 210 serves as the field-of-view image generation module 1529 to generate field-of-view image data for displaying an initial field-of-view image. The generated field-of-view image data is transmitted to the HMD 120 by the communication control module 540 via the field-of-view image generation module 1529.

In Step S1604, the monitor 130 of the HMD 120 displays the field-of-view image based on the signal received from the computer 200. The user 5A wearing the HMD 120 may recognize the virtual space 11 through visual recognition of the field-of-view image 11.

In Step S1605, the HMD sensor 410 detects the position and inclination of the HMD 120 based on a plurality of infrared rays emitted from the HMD 120. The detection result is transmitted to the computer 200 as movement detection data.

In Step S1606, the processor 210 serves as the field-of-view region determination module 1522 to identify a field-of-view direction of the user 5A wearing the HMD 120 based on the position and the inclination of the HMD 120. The processor 210 executes an application program to arrange the objects in the virtual space 11 based on an instruction included in the application program.

In Step S1607, the controller 1460 detects the operation by the user 5A in the real space. For example, in at least one aspect, the controller 1460 detects that a button has been pressed by the user 5A. As described above, the HMD sensor 410 or a sensor included in the controller 1460 detects the position and inclination of the controller 1460. A signal indicating the detection result is transmitted from the HMD sensor 410 or the controller 1460 to the computer 200. In this way, controller information including operation information indicating the content of the input operation by the user 5A to the controller 1460 and state information for identifying the state (e.g., position and inclination) of the controller 1460 is transmitted to the computer 200. The processor 210 then serves as the controller information acquisition module 1526 to acquire that controller information.

In Step S1608, the processor 210 serves as the controller information acquisition module 1526 and the chat control module 1527 to acquire from the server 600 avatar/character information (e.g., sound data, motion information, and controller information) on the other users sharing the virtual space 11.

In Step S1609, the processor 210 serves as the virtual object control module 1525 to control the motion of the avatar and the player character of each user based on the avatar/character information on each user 5, including the user 5A.

In Step S1610, the processor 210 serves as the field-of-view image generation module 1529 to generate field-of-view image data for representing a field-of-view image that is based on the results of processing in Step S1609, and outputs the generated field-of-view image data to the HMD 120.

In Step S1611, the monitor 130 of the HMD 120 updates the field-of-view image based on the received field-of-view image data, and displays the updated field-of-view image.

Figure 17:
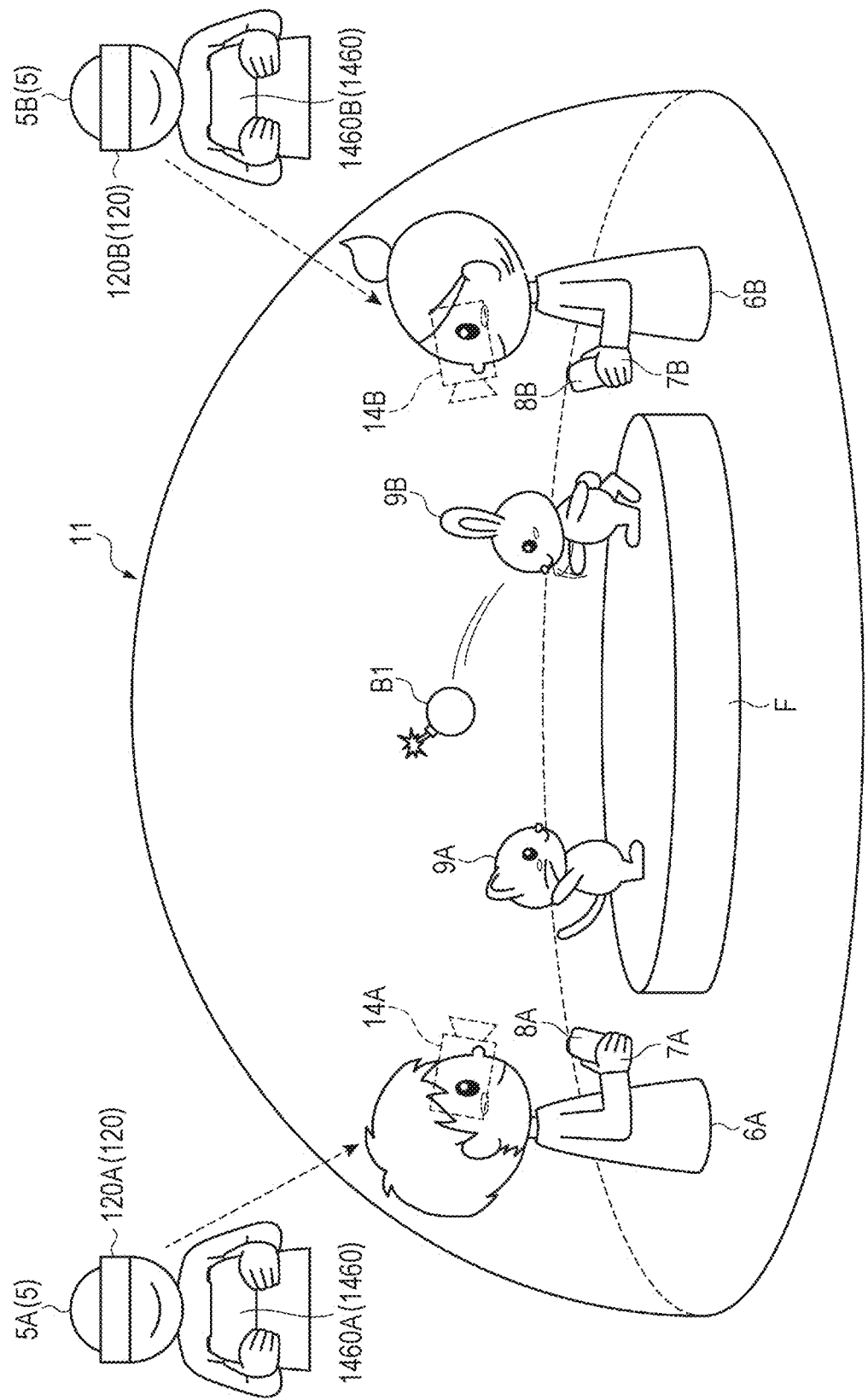
FIG. 17 A schematic diagram of a virtual space shared by a plurality of users according to at least one embodiment of this disclosure.

FIG. 17 is a schematic diagram of the virtual space 11 according to at least one embodiment of this disclosure. In FIG. 17, the virtual space 11 includes the avatar 6A (first avatar) associated with the user 5A, a player character 9A (first character object) operated based on an input operation on the controller 1460A (first controller) used by the user 5A, the avatar 6B (second avatar) associated with the user 5B (second user) different from the user 5A, a player character 9B (second character object) operated based on an input operation on the controller 1460B (second controller) used by the user 5B, a virtual camera 14A (first virtual camera) that defines a field-of-view image 1817 to be provided to the HMD 120A (first head-mounted device) including a monitor 130 (first display) and worn by the user 5A, and a virtual camera 14B (second virtual camera) that defines a field-of-view image 2517 to be provided to the HMD 120B (second head-mounted device) including a monitor 130 (second display) and worn by the user 5B. In the example of FIG. 17, the virtual space 11 further includes control objects 8A and 8B representing virtual controllers corresponding to the controllers 1460A and 1460B, respectively, and hand objects 7A and 7B representing virtual hands of the avatars 6A and 6B, respectively.

In the example of FIG. 17, in the virtual space 11, there is developed a competitive game (in this example, game in which a bomb B1 is thrown) in which a plurality of users 5A and 5B fight with the player character 9A or 9B of the other user on a game field F. In the virtual space 11, not only the player characters 9A and 9B related to the game, but also the avatars 6A and 6B holding the control objects 8A and 8B, are arranged at predetermined positions. As a result, in the virtual space 11, there is expressed a situation in which the avatars 6A and 6B of the respective users 5A and 5B are operating the player characters 9A and 9B, respectively. The virtual cameras 14A and 14B are associated with the viewpoints of the avatars 6A and 6B. As a result, the field-of-view images 1817 and 2517 are provided to the users 5A and 5B in a first-person viewpoint of the avatars 6A and 6B, respectively.

Figure 18:
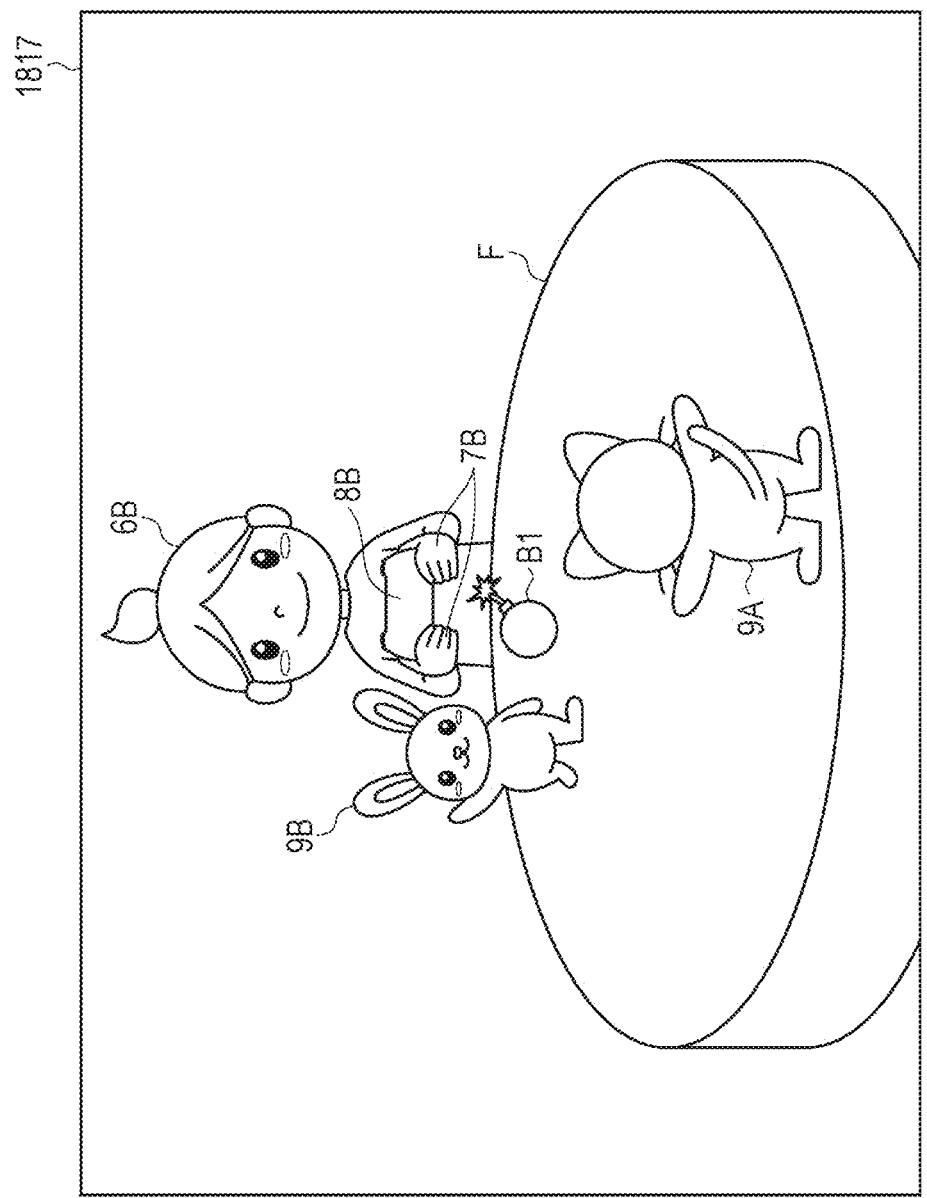
FIG. 18 A diagram of an example of a field-of-view image provided to a user according to at least one embodiment of this disclosure.

FIG. 18 is a diagram of an example of the field-of-view image 1817 provided to the user 5A via the HMD 120A according to at least one embodiment of this disclosure. In FIG. 18, the user 5A can enjoy a virtual experience as if he or she was present in the virtual space 11 as the avatar 6A by recognizing the field-of-view image 1817. Similarly, the user 5B can enjoy a virtual experience as if he or she was present in the virtual space 11 as the avatar 6B by recognizing the field-of-view image 2517.

In this case, the design of the control objects 8A and 8B in the virtual space 11 may be determined in accordance with the model and the like of the controllers 1460A and 1460B. For example, the processor 210 may acquire information indicating the model of the controller 1460A from the controller 1460A, and render the control object 8A based on the rendering data of the controller objects prepared in advance for each model as the object information 1532. As a result, the users 5A and 5B may each grasp the type of the controller 1460 used by the other user (e.g., whether the controller is a two-handed type or a one-handed type) based on the design of the control objects 8A and 8B displayed in the field-of-view images 1817 and 2517.

In such a virtual space 11, chatting and a multiplayer game between the avatars 6A and 6B may be provided to each user 5A and 5B. In this virtual space 11, there are the avatars 6A and 6B and the player characters 9A and 9B of the respective user 5A and 5B. Therefore, the users 5A and 5B can each enjoy a shared game in the virtual space 11 while recognizing the existence of the other user via the avatars 6A and 6B, and hence the users 5A and 5B can each easily obtain a sense that a plurality of people are having fun in the virtual space 11. As a result, the virtual experience of each of the users 5A and 5B can be more entertaining.

In at least one embodiment, in Step S1310A of FIG. 13, the processor 210 in the HMD set 110A serves as the controller information acquisition module 1526 to acquire the controller information on the controller 1460A. The processor 210 serves as the chat control module 1527 to acquire the sound data of the user 5A. The processor 210 acquires motion information including direction data and eye tracking data detected by the HMD sensor 410, the eye gaze sensor 140, and the like. As a result, avatar/character information including sound data, controller information, and motion information is acquired. In other words, in at least one embodiment, the avatar information described with reference to FIG. 13 is avatar/character information, and in each step of FIG. 13, the avatar information can be replaced with avatar/character information. The avatar/character information may include information (e.g., user ID) for identifying the avatar 6A (or user 5A) and information (e.g., room ID) for identifying the virtual space 11 in which the avatar 6A is present. The processor 210 serves as the chat control module 1527 to transmit the avatar/character information acquired as described above to the server 600 via the network 2.

In at least one embodiment, in Step S1330A of FIG. 13, the processor 210 in the HMD set 110A serves as the virtual object control module 1525 to update not only the information on the avatar object but also the information on the player character. Specifically, the virtual object control module 1525 controls the motions of the avatars 6A and 6B and the player characters 9A and 9B in the virtual space 11. The processing of Steps S1330B and S1330C is the same as the processing of Step S1330A.

Figure 19:
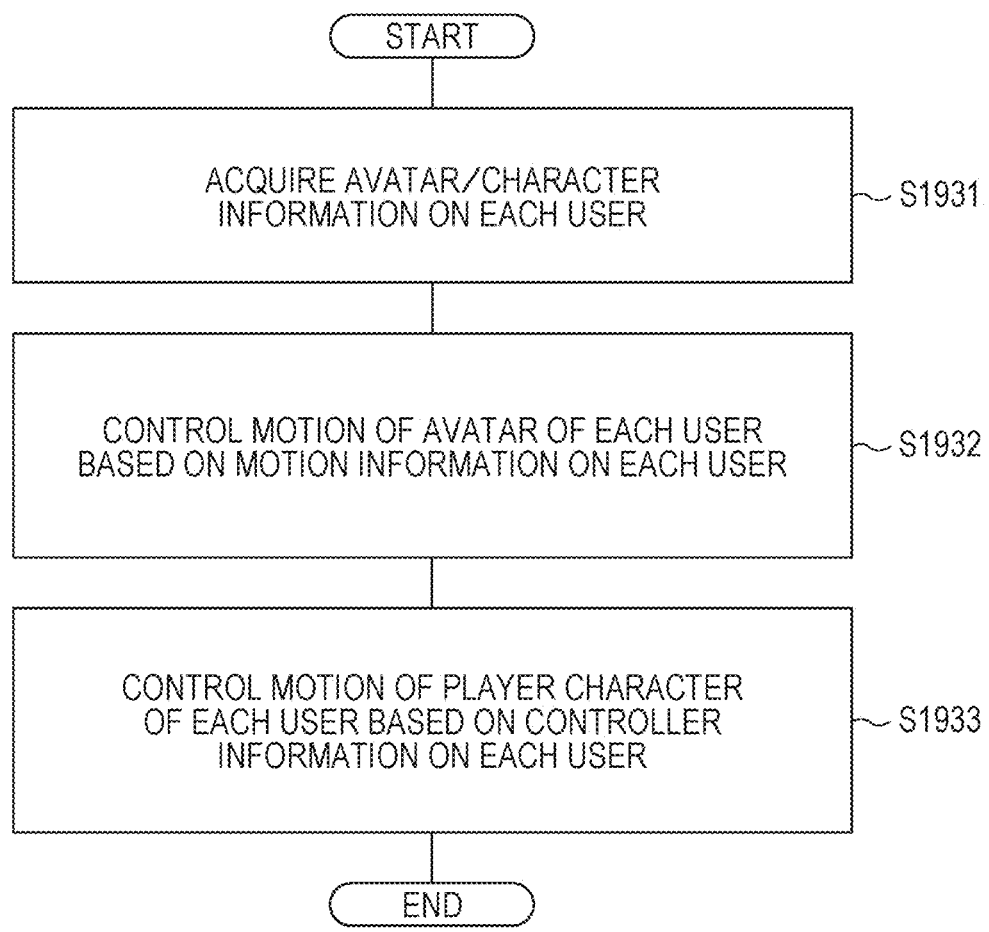
FIG. 19 A flowchart of processing of updating avatar object information according to at least one embodiment of this disclosure.

FIG. 19 is a flowchart of the processing of Step S1330A of FIG. 13 according to at least one embodiment of this disclosure. The details of processing (basic motion control of avatars and player characters) of Step S1330A are now described with reference to FIG. 19.

In Step S1931, the processor 210 acquires the avatar/character information (sound data, motion information, and controller information) on each of the users 5A and 5B from the server 600.

In Step S1932, the processor 210 controls the motion of each of the avatars 6A and 6B based on the motion information (direction data and eye tracking data) included in the avatar/character information on each of the users 5A and 5B. For example, the processor 210 changes, based on the direction data of each of the users 5A and 5B, the direction of the head of the corresponding avatar 6A or 6B. The processor 210 causes, based on the eye tracking data of each of the users 5A and 5B, the corresponding avatar 6A or 6B to blink, and changes the line-of-sight direction of that avatar 6A or 6B. The processor 210 calculates, based on the position information on the HMDs 120A and 120B included in the motion information and the position information on the controllers 1460A and 1460B included in the controller information, a relative position in the real space of each of the controllers 1460A and 1460B with respect to the HMDs 120A and 120B. Then, the processor 210 determines the position of the control objects 8A and 8B held by each avatar 6A and 6B based on that relative position. For example, the processor 210 arranges the control objects 8A and 8B in the virtual space 11 such that the relative positions in the real space of the controllers 1460A and 1460B with respect to the HMDs 120A and 120B match the relative positions in the virtual space 11 of the control objects 8A and 8B with respect to the head of each of the avatars 6A and 6B. The processor 210 determines the position of each of the hand objects 7A and 7B of the avatars 6A and 6B based on the position of each of the control objects 8A and 8B determined in this manner. For example, the processor 210 arranges the hand objects 7A and 7B such that the hand objects 7A and 7B each hold both sides of the control object 8A or 8B (see FIG. 17 and FIG. 18).

In Step S1933, the processor 210 controls the motions of the player characters 9A and 9B based on the controller information included in the avatar/character information on each of the users 5A and 5B. For example, the processor 210 changes the positions of the player characters 9A and 9B based on the details (operation information) of the input operation on the controllers 1460A and 1460B, and executes a specific motion (e.g., bomb-throwing motion and defensive motion).

Based on the motion control described above, the motions of the users 5A and 5B (in this case, motions of the head and eyes) and the motions that depend on the input operation on the controllers 1460A and 1460B may be translated in the avatars 6A and 6B and the player characters 9A and 9B. In the flowchart of FIG. 19, the processing of Step S1933 may be executed before the processing of Step S1932, or may be executed simultaneously and in parallel with the processing of Step S1932.

Figure 20:
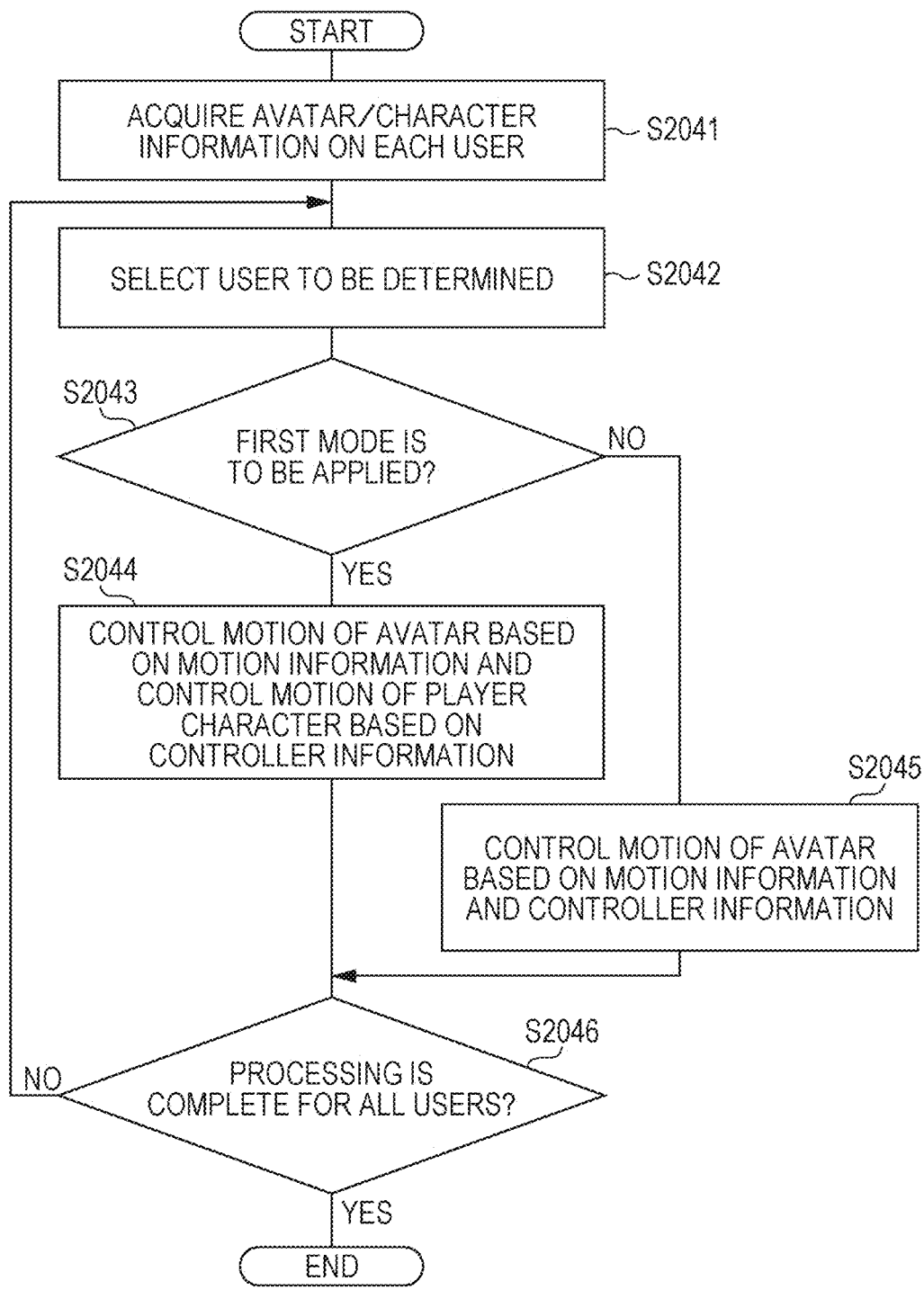
FIG. 20 A flowchart of processing to be executed according to at least one embodiment of this disclosure.

At least one embodiment has a configuration capable of switching between a first operation mode in which the player character is operated based on an input operation on the controller 1460 and a second operation mode in which the avatar is operated based on an input operation on the controller 1460. In the following, motion control of the avatar and the player character in at least one embodiment is described with reference to the flowchart of FIG. 20. FIG. 20 is a flowchart of processing to be executed in at least one embodiment in place of the flowchart of FIG. 19.

In Step S2041, the processor 210 acquires the avatar/character information on each of the users 5A and 5B from the server 600 in the same manner as the processing of Step S1931.

In Step S2042 to Step S2045, the processor 210 determines the operation mode to be applied to each user, and executes motion control on the avatar and the player character of each user in accordance with the operation mode to be applied.

In Step S2042, the processor 210 selects the user for which a determination is to be performed (in this case, user 5A as an example).

In Step S2043, the processor 210 determines the operation mode to be applied to the user 5A for which a determination is to be performed. For example, the processor 210 determines the operation mode to be applied based on whether an input operation determined in advance has been performed on the controller 1460A. For example, when a pressing operation of the touch pad 1464 is the input operation determined in advance, the first operation mode and the second operation mode may be switched each time the touch pad 1464 is pressed once. In this case, the processor 210 can determine the operation mode to be applied based on information indicating the current operation mode (e.g., information stored in memory module 520) and the controller information on the user 5A. For example, when the input operation determined in advance (in this case, pressing operation of touch pad 1464) is included in the operation information included in the controller information, the processor 210 can determine that the operation mode different from the current operation mode is the operation mode to be applied. On the other hand, when the operation information does not include the input operation determined in advance, the processor 210 can determine that the current operation mode is to be applied continuously.

In Step S2043, the processor 210 may also determine the operation mode to be applied based on the state of the controller 1460A. In this case, the processor 210 may identify the position or inclination of the controller 1460A by referring to the state information included in the controller information on the user 5A. For example, the processor 210 determines whether the inclination of the controller 1460A (e.g., inclination angle with respect to a time when upper surface of controller 1460A is parallel to horizontal plane) is equal to or more than a predetermined value. When the inclination of the controller 1460A is less than the predetermined value, the processor 210 may determine that the controller 1460A is in a first state in which the controller 1460A is held by the user 5A in both hands. On the other hand, when the inclination of the controller 1460A is equal to or more than the predetermined value, the processor 210 may determine that the controller 1460A is in a second state in which the controller 1460A is held by the user 5A in one hand. In response to a determination that the controller 1460A is in the first state, the processor 210 determines that the first operation mode is the mode to be applied, and in response to a determination that the controller 1460A is in the second state, the processor 210 determines that the second operation mode is the mode to be applied. As a result, the user 5A can intuitively switch between the first operation mode in which the player character 9A can be operated and the second operation mode in which the avatar 6A can be operated in accordance with how the controller 1460A is held (i.e., held in two-handed holding state or one-handed holding state).

In Step S2043, the processor 210 may also determine the operation mode to be applied based on the relative position of the controller 1460A with respect to the HMD 120A. For example, the processor 210 can determine based on the relative position whether the controller 1460A is positioned at a position higher than the height position of the head on the left side or the right side of the head of the user 5A. In response to a determination that the controller 1460A is in this state, the processor 210 may determine that the controller 1460A is in the second state (one-handed holding state).

When the operation mode is switched based on the input operation determined in advance by the user 5A to the controller 1460A, the above-mentioned state determination of the controller 1460A may also be used. For example, the processor 210 may switch the operation mode in response to a determination based on the above-mentioned determinations that the controller 1460A is in the second state (one-handed holding state) and the input operation determined in advance (e.g., pressing operation of upper buttons 1467) has been performed on the controller 1460A. In this way, based on a configuration in which the operation mode is switched when a predetermined condition regarding an input operation on the controller 1460A and a predetermined condition regarding the state of the controller 1460A are both satisfied, the occurrence of an erroneous operation related to switching of the operation mode may be suppressed. Usability for the user 5A may be improved by suppressing the occurrence of switching of the operation mode not intended by the user 5A.

In response to a determination that the first operation mode is to be applied (Step S2043: YES), in Step S2044, the processor 210 controls the motion of the avatar 6A (e.g., head direction and eye motion) based on the motion information on the user 5A in the same manner as the processing in Step S1932. The processor 210 controls the motion of the player character 9A based on the controller information on the user 5A in the same manner as the processing in Step S1933.

On the other hand, in response to a determination that the second operation mode is to be applied (Step S2043: NO), in Step S2045, the processor 210 controls the motion of the avatar 6A (e.g., head direction and eye motion) based on the motion information on the user 5A and the controller information. Further, the processor 210 controls the motion of a part of the virtual body of the avatar 6A based on the controller information on the user 5A. In a case in which the second operation mode is applied when the controller 1460A is in the second state (one-handed holding state), the processor 210 may also control the motion of the hand object 7A of the avatar 6A associated with a hand (left hand or right hand) of the user 5A holding the controller 1460A. For example, when the hand of the user 5A that is holding the controller 1460A is the right hand, the processor 210 may cause the hand object 7A corresponding to the right hand of the avatar 6A to execute a motion determined in advance. Whether the controller 1460A is held by the left hand or the right hand may be grasped based on the detected inclination of the controller 1460A or the details of the input operation on the controller 1460A. For example, the controller 1460A is required to be operated by the left hand (right hand) in order to depress the upper button 1467L (1467R), and thus, when a pressing operation of the upper button 1467L (1467R) is detected, the processor 210 may determine that the controller 1460A is being held by the left hand (right hand).

The motion to be executed by the avatar 6A based on the motion control described above may be determined in accordance with an input operation (e.g., pressing of an operation button 1463) on the controller 1460A by the hand of the user 5A that is holding the controller 1460A. In this case, the motion of the avatar 6A may be controlled by a two-step operation as in the following. Specifically, when the processor 210 detects that the controller 1460A is in the second state, the processor 210 may apply the second operation mode and change the state of the hand object 7A of the avatar 6A to a state determined in advance. In this case, as an example, the state determined in advance is assumed to be a state in which a bomb is held in the hand of the avatar 6A. Then, when the processor 210 detects a predetermined input operation (e.g., pressing of an operation button 1463) to the controller 1460A, the processor 210 may cause the hand object 7A to execute a motion of throwing the bomb. For example, the processor 210 serves as the virtual object control module 1525 to hurl a bomb, which is one type of target object, in a direction instructed from the user 5A by an input operation on the controller 1460A. Then, the processor 210 calculates the trajectory of the bomb by executing a physical calculation based on environmental conditions (e.g., gravity and air resistance) associated in advance with the virtual space 11, and causes the bomb to move along that trajectory.

Figure 21:
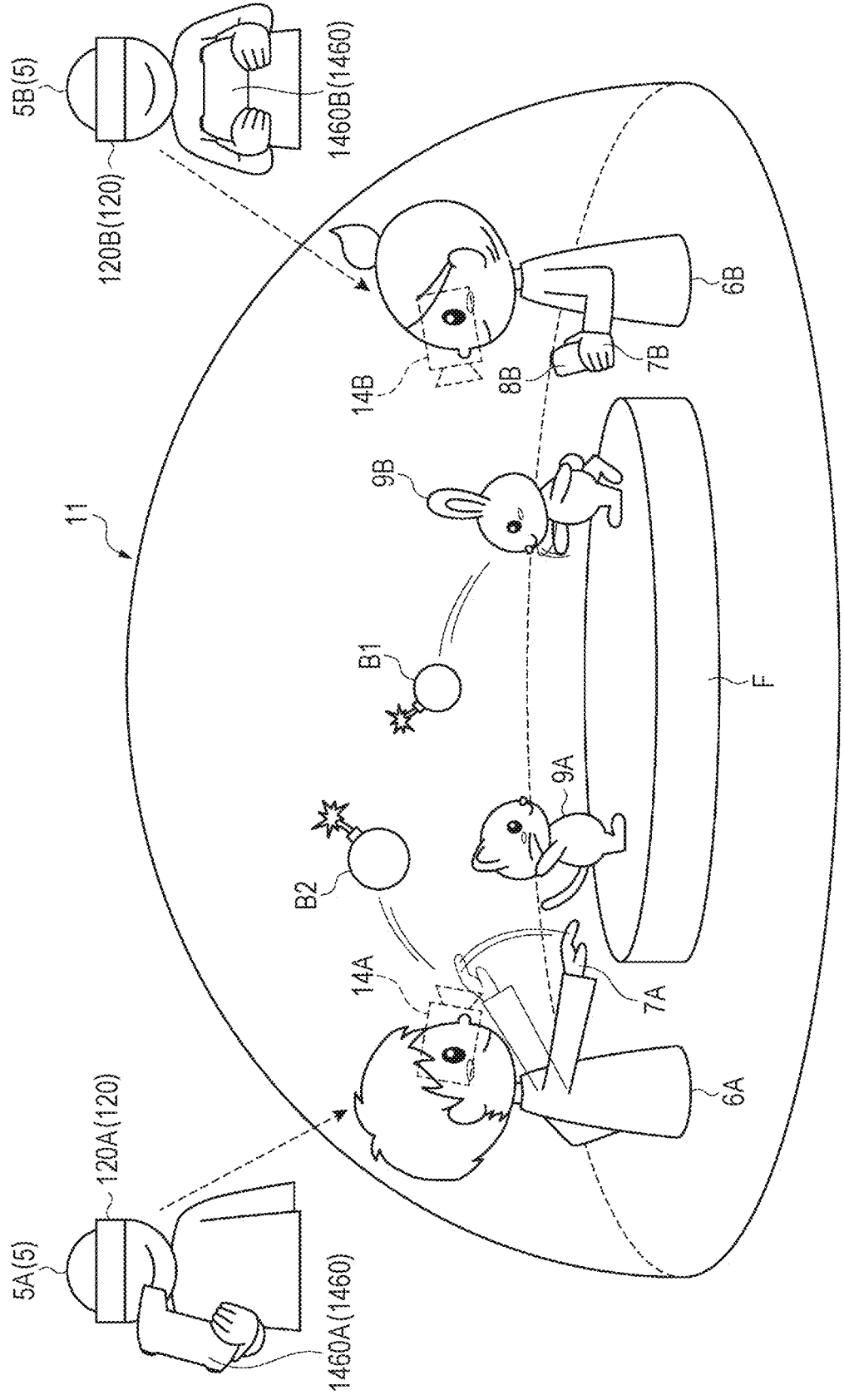
FIG. 21 A diagram of motion control of an avatar in a second operation mode according to at least one embodiment of this disclosure.

FIG. 21 is a diagram of motion control of the avatar 6A in the second operation mode. In the example of FIG. 21, the hand object 7A corresponding to the right hand of the avatar 6A throws a bomb B2 into the game field F based on the motion control of the avatar 6A described above. In this way, through switching the operation mode to the second operation mode, the user 5A may cause the avatar 6A to intervene in the game. More specifically, like in this example, the user 5A may support, for example, his/her player character 9A by operating the avatar 6A. For example, even when the player character 9A becomes unable to fight (or is temporarily paralyzed or in other such states), the user 5A may operate the avatar 6A and continue to intervene in the game by switching the operation mode to the second operation mode.

In Step S2046, the processor 210 determines whether processing is complete for all the users sharing the virtual space 11. In response to a determination that the processing is complete for all the users, the processor 210 ends the processing. In this way, the motions of the avatars and the player characters of the respective users are controlled in accordance with the operation mode applied to each user.

In at least one embodiment, when the first operation mode is applied to the user 5A, in the field-of-view image 1817 provided to the user 5A and the field-of-view image 2517 provided to the user 5B, the avatar 6A is displayed holding the control object 8A in the hand object 7A. As a result, based on the display content of the field-of-view images 1817 and 2517, the users 5A and 5B can each intuitively grasp that the first operation mode is applied to the user 5A.

On the other hand, when the second operation mode is applied to the user 5A, in the field-of-view image 1817 provided to the user 5A and the field-of-view image 2517 provided to the user 5B, the control object 8A is not displayed, and the hand object 7A of the avatar 6A is displayed in a manner corresponding to the input operation on the controller 1460A (see FIG. 21). As a result, based on the display content of the field-of-view images 1817 and 2517, the users 5A and 5B can each intuitively grasp that the second operation mode is applied to the user 5A.

In at least one embodiment, the operation mode to be applied may be determined from a plurality of operation modes including operation modes other than the first operation mode and the second operation mode. An example of an operation mode other than the first operation mode and the second operation mode is an operation mode in which a predetermined menu screen is displayed on a field-of-view image and a predetermined item on the menu screen is selected and operated.

At least one embodiment has a configuration capable of switching between a first viewpoint mode, in which the virtual camera 14 is associated with the viewpoint of the avatar, and a second viewpoint mode, in which the virtual camera 14 is associated with the viewpoint of the player character.

Specifically, as a part of the processing of Step S1610 in FIG. 16, the processor 210 determines the viewpoint mode to be applied, generates field-of-view image data for displaying a field-of-view image in accordance with the determined viewpoint mode, and outputs the generated field-of-view image data to the HMD 120. The processing in at least one embodiment is now described with reference to the flowchart of FIG. 22. FIG. 22 is a flowchart of the processing procedure of Step S1610 in FIG. 16 that is executed in at least one embodiment.

In Step S2251, the processor 210 determines which of the first viewpoint mode and the second viewpoint mode is to be applied. In this case, the viewpoint mode may be switched in the same manner as the switching of the operation mode described above, namely, may be switched based on at least one of an input operation determined in advance on the controller 1460A (e.g., pressing of a predetermined operation button 1463) or the state of the controller 1460A (e.g., position and inclination). More specifically, the user 5A may freely switch the viewpoint by performing an input operation determined in advance on the controller 1460A or setting the controller 1460A to a state determined in advance (e.g., one-handed holding state). Information indicating the viewpoint mode applied at the current time may be stored in the memory module 520. In this case, the processor 210 may determine the viewpoint mode to be applied by referring to the memory module 520.

In response to a determination that the first viewpoint mode is to be applied (Step S2251: YES), in Step S2252, the processor 210 generates, based on the virtual camera 14A to which the first viewpoint mode is applied, field-of-view image data for displaying the field-of-view image (see field-of-view image 1817 of FIG. 18) associated with the viewpoint of the avatar 6A.

On the other hand, in response to a determination that the second viewpoint mode is to be applied (Step S2251: NO), in Step S2253, the processor 210 generates, based on the virtual camera 14A to which the second viewpoint mode is applied, field-of-view image data for displaying the field-of-view image associated with the viewpoint of the player character 9A. In this case, the viewpoint of the player character 9A may be a first-person viewpoint of the player character 9A or may be a third-person viewpoint photographed from slightly behind the player character 9A.

As described above, in general, the line-of-sight direction of the avatar 6A is controlled based on the eye tracking data of the user 5A. However, when the second viewpoint mode is applied, the user 5A visually recognizes the inside of the virtual space 11 from the viewpoint of the player character 9A in place of the viewpoint of the avatar 6A. Therefore, the line-of-sight direction of the user 5A in the real space in this case is required to be translated in the player character 9A, and not in the avatar 6A. However, unless special processing is executed, even when the second viewpoint mode is applied, the line-of-sight direction of the user 5A in the real space is translated in the avatar 6A. Therefore, when the avatar 6A is included in the field-of-view image 2517 provided to another user (in this case, user 5B), in the field-of-view image 2517, the line-of-sight direction of the avatar 6A may be directed in a direction that the user 5A is not actually looking. Such a situation is undesirable because it gives the user 5B a sense of unease and may impair the sense of immersion of the user 5B in the virtual space 11. This also results in erroneous information being notified to the user 5B, and hence when the direction the avatar 6A is looking (i.e., direction user 5A is looking) is relevant information for playing the game, suitable game progress may be hindered.

Therefore, in at least one embodiment, when the second viewpoint mode is applied, the processor 210 may output to the computer 200 (i.e., processor 210 of HMD set 110B) connected to the HMD 120B worn by the user 5B auxiliary information for identifying the position the user 5A is looking at via the viewpoint of the player character 9A. For example, the processor 210 may transmit the auxiliary information to the server 600 as a part of the above-mentioned avatar/character information. As a result, the processor 210 of the HMD set 110B may properly express the line-of-sight direction of the avatar 6A in the field-of-view image 2517 based on the auxiliary information.

The auxiliary information is, for example, information for identifying the position the user 5A is looking at via the viewpoint of the player character 9A (hereinafter referred to as "point of interest"). The point of interest may be identified based on the eye tracking data of the user 5A and the viewpoint position in the virtual space 11 (i.e., viewpoint position of player character 9A). For example, the processor 210 identifies, based on the eye tracking data, the line-of-sight direction with respect to the position of the virtual camera 14A (viewpoint position of player character 9A) for which the second viewpoint mode is applied as a reference position. Then, the processor 210 identifies a virtual object ahead in the line-of-sight direction (i.e., target that user 5A is actually paying attention to via viewpoint of player character 9A), and identifies the position at which that line-of-sight direction intersects the virtual object as the point of interest. Then, the processor 210 may generate information (e.g., coordinate data) indicating the point of interest as auxiliary information. On the other hand, when there is no virtual object ahead of the line of sight of the player character 9A, the processor 210 may identify the intersection position between the line of sight of the player character 9A and a celestial panoramic image 13 as the point of interest (see FIG. 4). When the line of sight of the player character 9A intersects a reference plane (e.g., ground defined in virtual space 11) determined in advance, the processor 210 may identify that intersection position as the point of interest.

It is not necessary for the auxiliary information to be information directly indicating the point of interest, and the auxiliary information may be information to be used for identifying the point of interest. For example, the auxiliary information may be paired information on the eye tracking data of the user 5A and the viewpoint position of the player character 9A. In this case, the processor 210 of the HMD set 110B that has received the auxiliary information may identify the point of interest based on that auxiliary information, or the server 600 that first receives the avatar/character information may identify the point of interest based on the auxiliary information included in the avatar/character information, and transmit information indicating the identified point of interest to the HMD set 110B. In this case, the processing for identifying the point of interest may be performed collectively on the server 600 side.

The processing to be executed by the HMD set 110B in at least one embodiment is now described with reference to the flowchart of FIG. 23. FIG. 23 is a flowchart of the processing to be executed on the HMD set 110B side corresponding to the processing of Step S10 of FIG. 16. In the description of this flowchart, unless stated otherwise, "processor 210" refers to the processor 210 of the HMD set 110B.

In Step S2361, the processor 210 determines whether auxiliary information has been acquired from the HMD set 110A. For example, the processor 210 may execute the above-mentioned determination based on whether avatar/character information on the user 5A includes information corresponding to the auxiliary information.

In response to a determination that the auxiliary information has been acquired (Step S2361: YES), in Step S2362, the processor 210 determines the line-of-sight direction of the avatar 6A based on the auxiliary information. For example, when the auxiliary information is information indicating the above-mentioned point of interest, the processor 210 determines the line-of-sight direction of the avatar 6A such that the avatar 6A faces the point of interest. As a result, there is provided to the user 5B a field-of-view image 2517 in which the line-of-sight direction of avatar 6A is appropriately expressed such that the avatar 6A faces the position that the user 5A is actually looking at via the player character 9A.

On the other hand, in response to a determination that the auxiliary information has been acquired (Step S2361: NO), the processor 210 can determine that the user 5A is using the first viewpoint mode. Therefore, in Step S2363, the processor 210 determines the line-of-sight direction of the avatar 6A based on the eye tracking data of the user 5A as usual.

Figure 24:
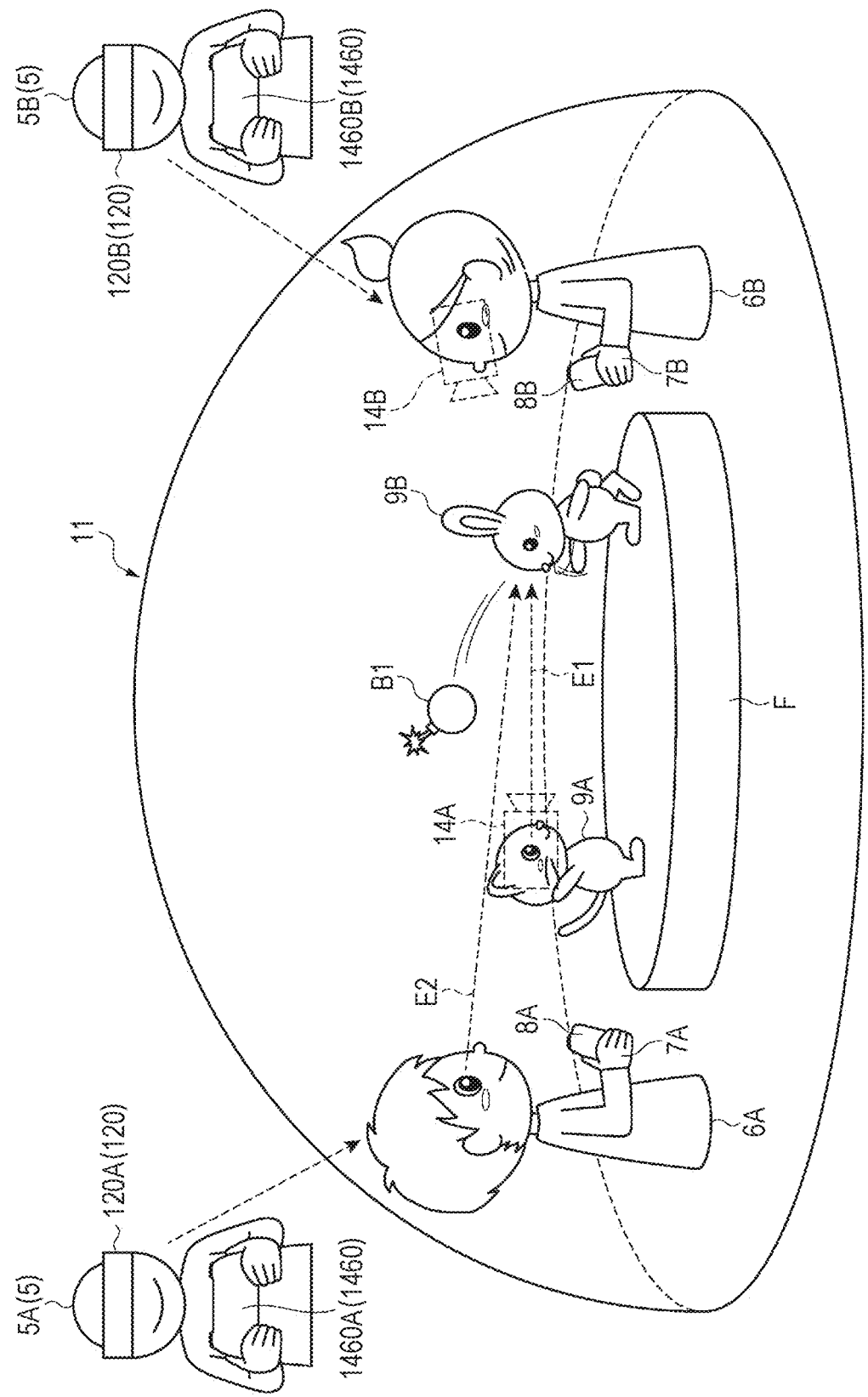
FIG. 24 A diagram of an example of the virtual space according to at least one embodiment of this disclosure.
Figure 25:
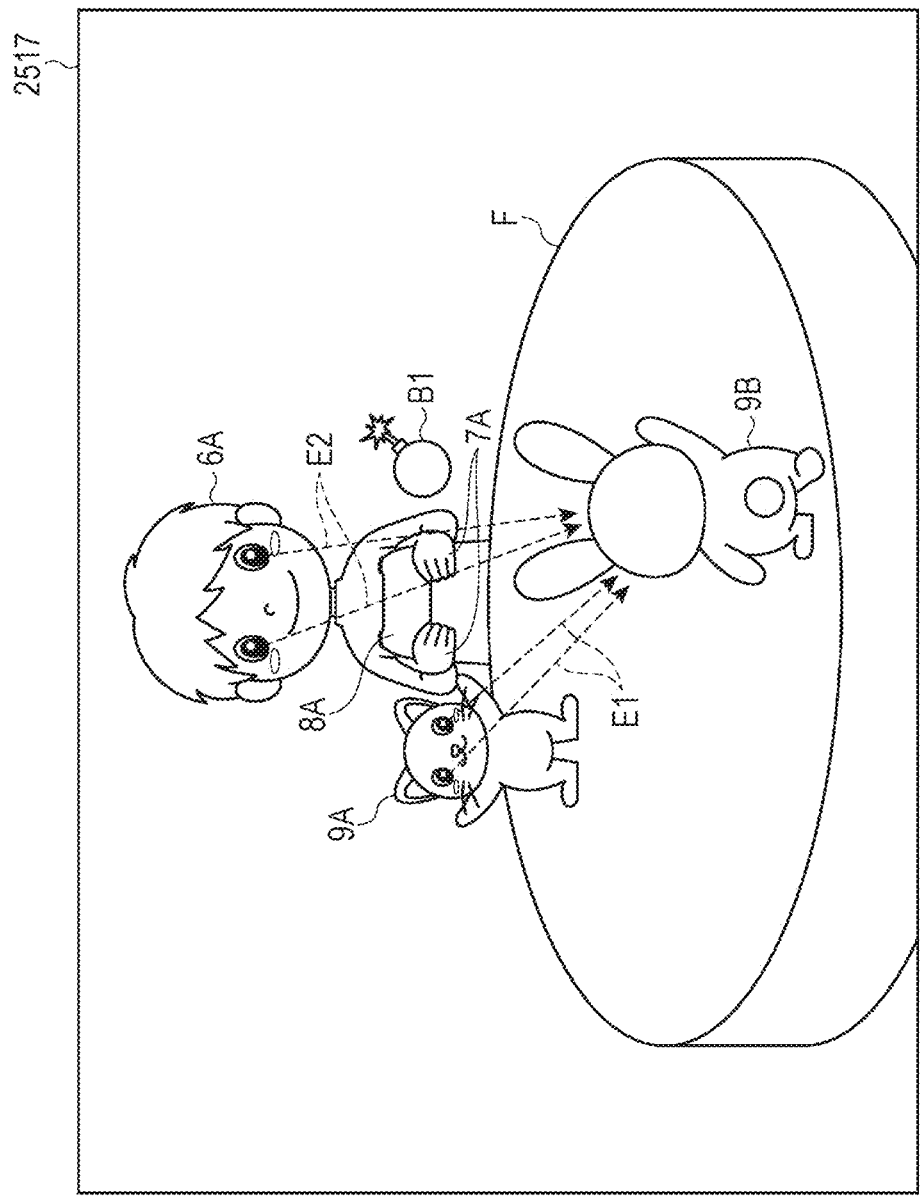
FIG. 25 A diagram of a field-of-view image provided to a user according to at least one embodiment of this disclosure.

FIG. 24 is a diagram of the virtual space 11 at a time when the control of FIG. 23 is executed, and FIG. 25 is a diagram of the field-of-view image 2517 at a time when the control of FIG. 23 is executed. In FIG. 24, when the second viewpoint mode is applied to the virtual camera 14A of the user 5A, the virtual camera 14A is associated with the viewpoint of the player character 9A. In this example, the user 5A is looking at a target (player character 9B) ahead in a line-of-sight direction E1 via the viewpoint of the player character 9A. More specifically, in this example, the position at which the player character 9B intersects the line-of-sight direction E1 corresponds to the above-mentioned point of interest.

When the line-of-sight direction of the avatar 6A is determined based on the eye tracking data of the user 5A on the HMD set 110B side, the line-of-sight direction of the avatar 6A is expressed such that the line-of-sight direction is parallel to the line-of-sight direction E1 of the player character 9A. However, as described above, when the field-of-view image 2517 expressed in this manner is provided to the user 5B, the user 5B may feel uncomfortable. Therefore, in at least one embodiment, the control of FIG. 23 is executed on the HMD set 110B side. As a result, in FIG. 25, in a field-of-view image M2 provided to the user 5B, a line-of-sight direction E2 of the avatar 6A is expressed based on the auxiliary information such that the avatar 6A faces the player character 9B.

As described above, through transmitting the auxiliary information from the HMD set 110A, in which the second viewpoint mode is applied, to another HMD set 110B, the HMD set 110B can appropriately determine the line-of-sight direction of the avatar 6A based on the auxiliary information. With such a configuration, even when one user 5A switches the viewpoint mode to the second viewpoint mode, the sense of immersion in the virtual space 11 by another user 5B may be prevented from being impaired without the user 5B feeling a sense of unease. In other words, from the opposite viewpoint, even when the second viewpoint mode is applied to another user 5A, one user 5B may correctly grasp the target that the other user 5A is paying attention to based on the line-of-sight direction E2 of the avatar 6A of the user 5A.

For example, when the virtual space 11 is shared by three or more users and the game field F is wide, a situation may occur in which one user tries to find an exciting location in the game based on the line-of-sight directions of the other users as a clue. In the control of the line-of-sight direction of the avatar based on the auxiliary information described above, the line-of-sight direction of the avatar of the user to which the second viewpoint mode is applied is appropriately expressed. Therefore, regardless of the viewpoint mode being used by the other users, each user can easily grasp an exciting location in the game based on the line-of-sight directions of the avatars of the other users as a clue.

In at least one embodiment, when a condition determined in advance is satisfied in the virtual space 11, the viewpoint mode associated with that condition may be forcibly applied. For example, in a case in which the processor 210 determines that the player character 9A is unable to fight (when the player character 9A is in a state determined in advance) when the second viewpoint mode is applied to the user 5A, the processor 210 may forcibly switch from the second viewpoint mode to the first viewpoint mode. This enables the viewpoint to be forcibly returned to the operable avatar 6A when the player character 9A is in an inoperable state. As a result, the user 5A can play the game smoothly. The trigger for forcibly switching the viewpoint mode is not limited to this example. For example, the processor 210 may forcibly switch from the first viewpoint mode to the second viewpoint mode when an event determined in advance occurs during application of the first viewpoint mode to the user 5A.

The viewpoint mode to be applied may be determined from a plurality of viewpoint modes including a viewpoint mode other than the first viewpoint mode and the second viewpoint mode. As an operation mode other than the first viewpoint mode and the second viewpoint mode, there may be considered, for example, a viewpoint mode for viewing the avatar and the player character from above those objects.

In at least one embodiment, switching between the first mode, in which the motions of the left and right hand objects 7A are determined based on the position of the controller 1460A, and the second mode, in which the motions of the left and right hand objects 7A are determined separately from each other, is possible. The motion control of the hand objects of the avatar in this modification example is also applicable to a case in which there is no player character in the virtual space 11, and there is only an avatar present in the virtual space 11 (e.g., when only chatting via the avatar).

Figure 26:
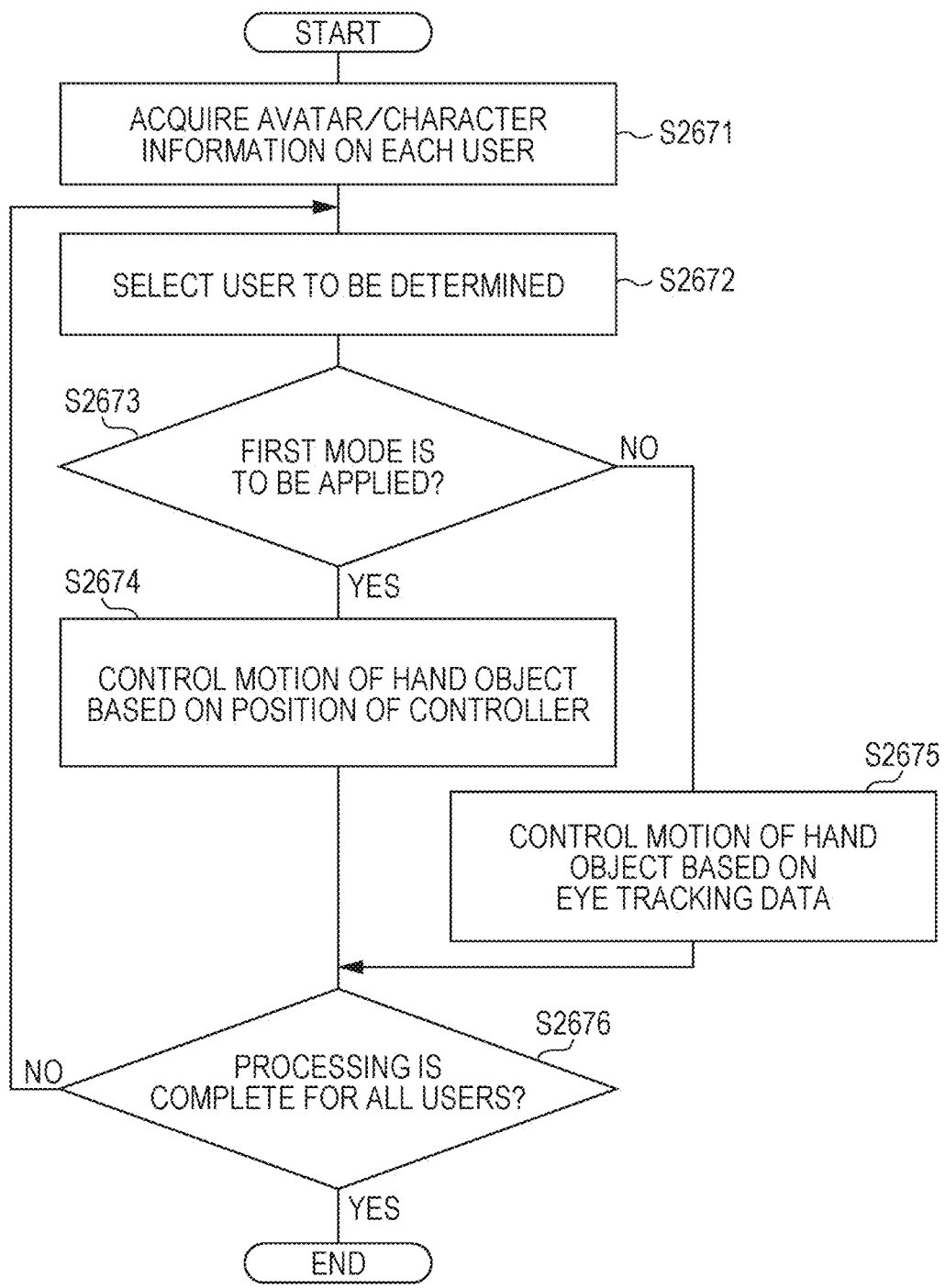
FIG. 26 A flowchart of processing according to at least one embodiment of this disclosure.

In the following, the processing in at least one embodiment is described with reference to the flowchart of FIG. 26. FIG. 26 is a flowchart of, of the processing to be executed in place of the flowchart of FIG. 19, processing related to the motion control of the hand objects of the avatar (i.e., a part of the processing of Step S1330A in FIG. 13). Therefore, in FIG. 26, the processing related to the motion control of parts other than the hand objects of the avatar and the processing related to the motion control of the player character are omitted.

In Step S2671, the processor 210 acquires the avatar/character information on each of the users 5A and 5B from the server 600 in the same manner as the processing of Step S1931.

In Step S2672 to Step S2675, the processor 210 determines the mode to be applied to each user, and executes motion control on the hand object of the avatar of each user in accordance with the mode to be applied.

In Step S2672, the processor 210 selects the user for which a determination is to be performed (in this case, user 5A as an example).

In Step S2673, the processor 210 determines the mode to be applied to the user 5A for which a determination is to be performed. For example, the processor 210 can determine the mode to be applied by the same method as the first modification example (Step S2043 in FIG. 20).

In response to a determination that the first mode is to be applied (Step S2673: YES), in Step S2674, the processor 210 controls the motion of the hand object 7A of the avatar 6A based on the position of the controller 1460. For example, the processor 210 may arrange the hand object 7A of the avatar 6A in the virtual space 11 based on the relative position of the controller 1460 with respect to the HMD 120A. Specifically, the processor 210 may arrange the control object 8A in the virtual space 11 such that the relative position in the real space of the controller 1460A with respect to the HMD 120A matches the relative position in the virtual space 11 of the control object 8A with respect to the head of the avatar 6A. The processor 210 may also arrange the left and right hand objects 7A such that the left and right hand objects 7A hold both sides of the control object 8A determined in this way. As a result, when the first mode is applied, the hand objects 7A and the control object 8A may be moved in accordance with changes in the relative position of the controller 1460 with respect to the HMD 120A.

With the processing of Step S2674, when the first mode is to be applied to the user 5A, in the field-of-view image 1817 provided to the user 5A and the field-of-view image 2517 provided to the user 5B, the avatar 6A is displayed holding the control object 8A in the hand objects 7A. As a result, based on the display content of the field-of-view images 1817 and 2517, the users 5A and 5B may each intuitively grasp that the first mode is applied to the user 5A.

The control object 8A corresponding to the controller 1460A is displayed in the field-of-view images 1817 and 2517, and hence the type of the controller 1460A used by the user 5A (e.g., whether the controller is a two-handed type or a one-handed type) may be grasped by the user 5B. For example, among the plurality of users sharing the virtual space 11, there may be a user who uses a high-function controller capable of accurately translating motions of the hands in the real space in the avatar (e.g., hand device that is worn separately on the left and right hands and that is equipped with a motion sensor). On the other hand, there may be a user who uses a low-specification controller, for example, the controller 1460 of at least one embodiment (in this case, a two-handed controller). For users using such a low-specification controller, the motions of the hands in the real space of the user cannot be translated in the avatar. As a result, the motions of the avatar of that user are monotonous, and hence surrounding users may erroneously think that the user is not enjoying the virtual experience. Therefore, informing the other users of the specifications of the controller by displaying a controller object in the field-of-view image in the manner described above may contribute to smoother communication in the virtual space.

When the avatar 6A is represented holding a control object 8A in the field-of-view image in a manner that does not fit the world view to be provided in the virtual space 11, for example, the users may feel uneasy. Therefore, the processor 210 may arrange the hand objects 7A in the virtual space 11, but not arrange the control object 8A. Whether the control object 8A is arranged may be switched by an explicit operation by the user 5A (e.g., predetermined operation on controller 1460).

In response to a determination that the second mode is to be applied (Step S2673: NO), in Step S2675, the processor 210 separately determines the motions of the left and right hand objects 7A. For example, the processor 210 identifies the specific position that the user 5A is paying attention to in the virtual space 11 by the method described above based on the eye tracking data (line-of-sight information) of the user 5A. The processor 210 may also cause the hand object 7A to move such that one of the left and right hand objects 7A points to a specific position.

The processor 210 may also control, based on the detection of an input operation determined in advance to the controller 1460A, the motions of the left and right hand objects 7A such that the left or right hand object 7A associated with that input operation points to a specific position. For example, when the upper button 1467L on the left side of the controller 1460A has been pressed, the processor 210 may cause the left hand object 7A to move, and when the upper button 1467R on the right side of the controller 1460A has been pressed, the processor 210 may cause the right hand object 7A to move.

In Step S2676, the processor 210 determines whether processing is complete for all the users sharing the virtual space 11. In response to a determination that the processing is complete for all the users, the processor 210 ends the processing. In this way, the motions of the hand objects of the avatars of the respective users are controlled in accordance with the mode applied to each user.

Figure 27:
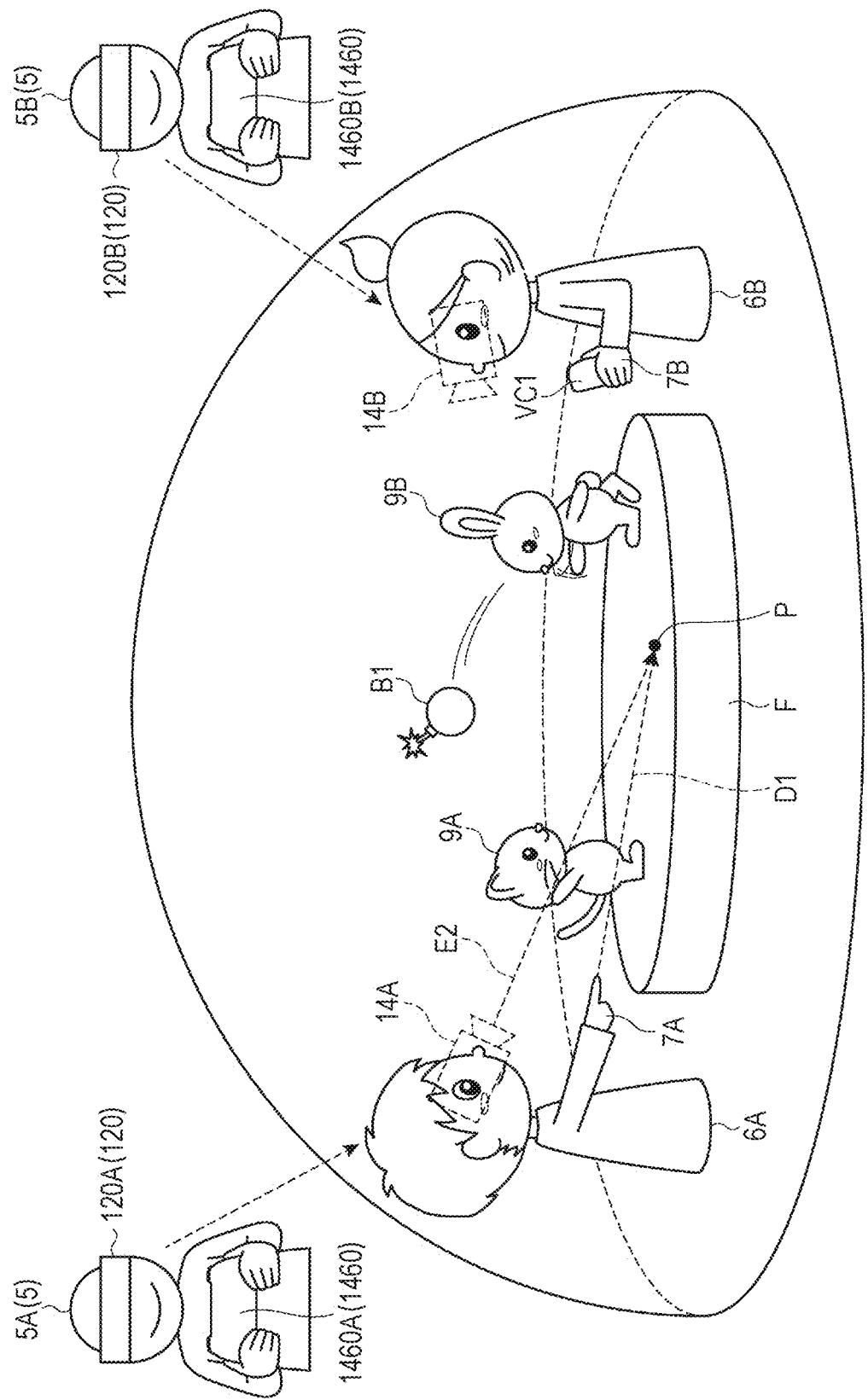
FIG. 27 A diagram of motion control of a hand object of the avatar in a second mode according to at least one embodiment of this disclosure.

FIG. 27 is a diagram of motion control of the hand object 7A of the avatar 6A in the second mode. Specifically, FIG. 27 includes a state in which, based on the motion control described above, the hand object 7A corresponding to the right hand of the avatar 6A points to a specific position P identified based on the line-of-sight direction E2 of the avatar 6A. Therefore, in a situation where the users 5A and 5B cooperate with each other to play the game, the user 5A can issue an instruction to the user 5B (e.g., instruction indicating a target position to throw the bomb B1) by executing a motion of pointing to the avatar 6A. In this way, even while actually operating the controller 1460A with both hands, the user 5A can cause the hand object 7A of the avatar 6A to execute a predetermined motion (in this case, pointing) not associated with the motion of the hands of the actual user 5A. As a result, even a user who does not have a high-specification controller equipped with a motion sensor or the like can intuitively communicate to/from other users in the virtual space 11. In particular, the motion control of the hand objects 7A of the avatar 6A according to this modification example is effective in a game cooperatively played by a plurality of users.

This concludes the description of at least one embodiment of this disclosure. However, the description of at least one embodiment of this disclosure is not to be read as a restrictive interpretation of the technical scope of this disclosure. At least one embodiment of this disclosure is merely given as an example, and is to be understood by a person skilled in the art that various modifications can be made to at least one embodiment of this disclosure within the scope of this disclosure set forth in the appended claims. Thus, the technical scope of this disclosure is to be defined based on the scope of this disclosure set forth in the appended claims and an equivalent scope thereof.

For example, the processing related to the motion control of the avatar and the player character (processing of Step S1609 in FIG. 16) may be executed in the HMD system of each user only for the avatars or the like included in the field-of-view image. As a result, the processing for controlling avatars or the like not included in the field-of-view image can be reduced. Whether an avatar or the like is included in the field-of-view image may be determined, for example, based on whether an avatar or the like is included in the field-of-view region 15 defined based on the field-of-view direction identified by the processing of Step S1606 in FIG. 16.

Part or all of the processing (e.g., Steps S1601 to S1603, S1606, S1609, and S1610 of FIG. 16) executed by the computer 200 (processor 210) of each HMD set 110 may be executed by the server 600, or by the computer 200 and the server 600 in a distributed manner. This enables the processing amount on the HMD set 110 side to be reduced by placing a part or all of the processing burden on the server 600 side. Processing efficiency may also be improved by causing the server 600 to collectively execute processing that is used in all of the HMD sets 110.

The mode of the controller is not limited to the above-mentioned controller 1460 (see FIG. 14). For example, in the HMD set 110, there may be used a controller including left and right controllers that are each detachably mountable to a support member like a controller for the Nintendo Switch (trademark). A modification example (controller 2860) of such a controller is now described with reference to FIG. 28A and FIG. 28B. In the following, there is described an example of a method of determining a state (in particular, one-handed holding state and two-handed holding state described above) when the controller 2860 is used. Meanwhile, the functions, roles, and the like of the various buttons and the like of the controller 2860 are the same as the functions, roles, and the like of the various buttons and the like of the controller 1460 described above, and hence a detailed description thereof is not repeated here.

Figure 28A:
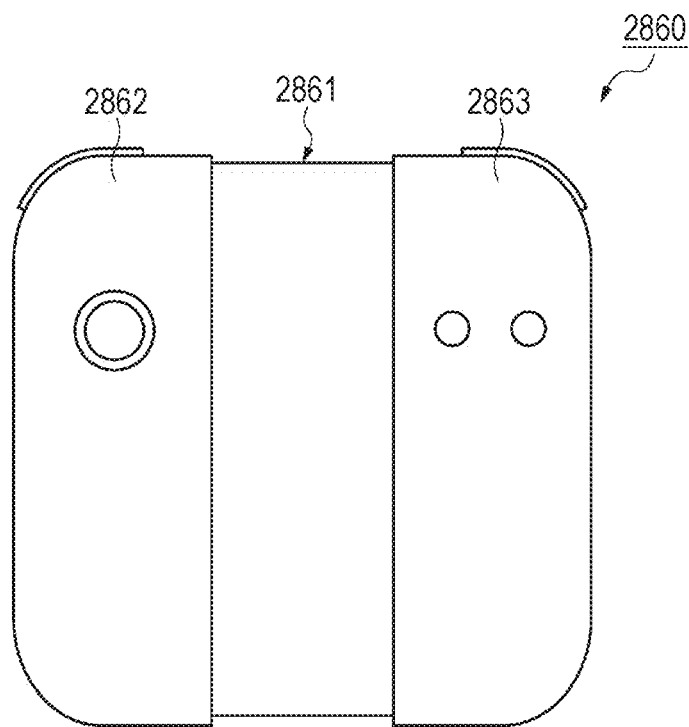
FIG. 28A A diagram of the controller according to at least one embodiment of this disclosure.
Figure 28B:
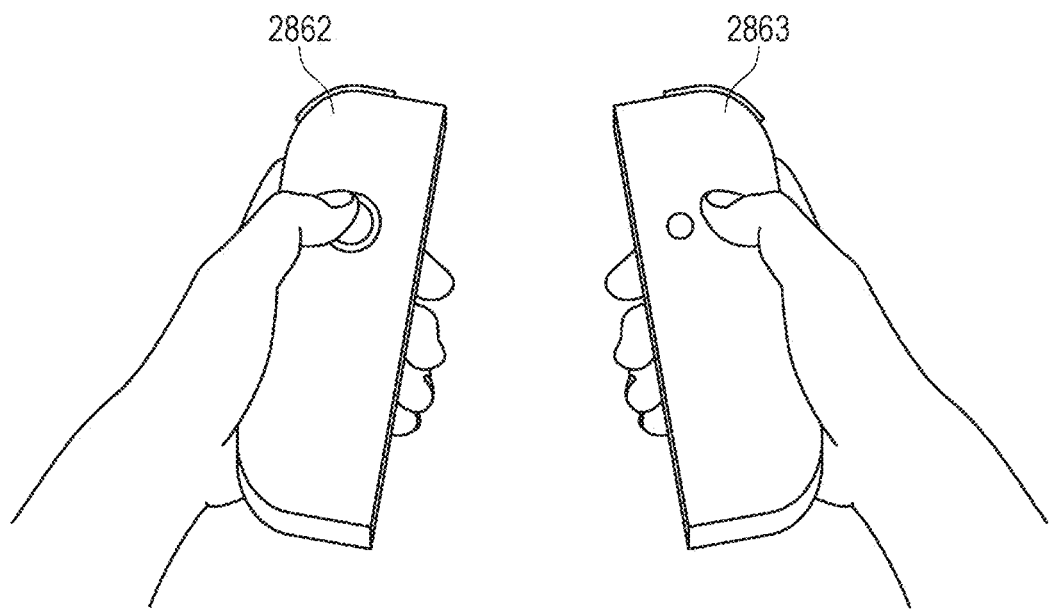
FIG. 28B A diagram of the controller according to at least one embodiment of this disclosure.

In FIG. 28A and FIG. 28B, the controller 2860 includes a support member 2861, a left controller 2862, and a right controller 2863. The left controller 2862 and the right controller 2863 each include various buttons and the like for receiving operations from the user 5. The left controller 2862 and the right controller 2863 are detachably mountable by sliding with respect to the support member 2861.

FIG. 28A includes a state in which both the left controller 2862 and the right controller 2863 are mounted to the support member 2861 (hereinafter referred to as "mounted state"). In the mounted state, the left controller 2862 is operated by the left hand of the user 5, and the right controller 2863 is operated by the right hand of the user 5. More specifically, in the mounted state, the controller 2860 is operated as an integrated controller that is held by the user 5 in both hands. Therefore, the processor 210 may associate the mounted state with the above-mentioned two-handed holding state. In other words, when the controller 2860 is in the mounted state, the processor 210 may determine that the controller 2860 is in the above-mentioned two-handed holding state.

FIG. 28B includes a state in which both the left controller 2862 and the right controller 2863 are not mounted to the support member 2861. In this manner, under a state in which at least one of the left controller 2862 and the right controller 2863 is not mounted to the support member 2861 (hereinafter referred to as "non-mounted state"), the user 5 can independently move the left controller 2862 and the right controller 2863. For example, the user 5 may swing and wave only the right controller 2863 over his/her head independently of the left controller 2862. Therefore, the processor 210 may associate the non-mounted state with the above-mentioned one-handed holding state. In other words, when the controller 2860 is in the non-mounted state, the processor 210 may determine that the controller 2860 is in the above-mentioned one-handed holding state.

Information indicating whether the left controller 2862 and the right controller 2863 are mounted to the support member 2861 may be notified from the left controller 2862 and the right controller 2863 to the processor 210 as a part of the controller information described above. As a result, the processor 210 may grasp whether the controller 2860 is in a mounted state or a non-mounted state based on the controller information. However, the state determination applicable to the controller 2860 is not limited to a determination based on whether the controller 2860 is in the mounted state. For example, the state determination may be executed based on, in addition to whether the controller 2860 is in a mounted state, whether a button operation determined in advance has been performed. The non-mounted state includes not only the state of FIG. 28B in which both the left controller 2862 and the right controller 2863 are not mounted to the support member 2861, but also a state in which only the left controller 2862 is not mounted to the support member 2861, and a state in which only the right controller 2863 is not mounted to the support member 2861.

The subject matter disclosed herein is represented as, for example, the following items.

(Item 1)

An information processing method to be executed on a computer (computer 200 or server 600) in order to provide a virtual space 11 to a first user (user 5A) via a head-mounted device (HMD 120A) including a display (monitor 130). The method includes acquiring (e.g., Step S1601 of FIG. 16) virtual space data defining the virtual space 11 including a first avatar (avatar 6A) associated with the first user, a first character object (player character 9A) operated based on an input operation on a first controller (controller 1460A) used by the first user, a second avatar (avatar 6B) associated with a second user (user 5B), a second character object (player character 9B) operated based on an input operation on a second controller (controller 1460B) used by the second user, and a virtual camera 14A defining a field-of-view image 1817 to be provided to the head-mounted device. The method further includes providing (e.g., Step S1610 of FIG. 16) the field-of-view image 1817 defined by the virtual camera 14A to the first user via the head-mounted device (HMD 120A).

With the information processing method according to this item, the first user can enjoy a game shared with the second user in the virtual space 11 while recognizing the presence of the second user via the second avatar. This enables the first user to easily obtain a sense of having fun with a plurality of people. As a result, the virtual experience of the first user can be more entertaining.

(Item 2)

The information processing method according to Item 1, further including determining (e.g., Step S2043 of FIG. 20), based on at least one of an input operation determined in advance to the first controller or a state of the first controller, an operation mode to be applied from among a plurality of operation modes including a first operation mode, in which the first character object is operated based on the input operation on the first controller, and a second operation mode, in which the first avatar is operated based on the input operation on the first controller. The method further includes controlling (e.g., Steps S2044 and S2045 of FIG. 20) a motion of the first avatar or the first character object in the virtual space based on the input operation on the first controller and the operation mode to be applied.

With the information processing method according to this item, the first user can cause the first avatar to intervene in the game by switching the operation mode to the second operation mode.

(Item 3)

The information processing method according to Item 2, further including acquiring (e.g., Step S2041 of FIG. 20) state information for identifying an inclination and a position of the first controller, in which the determining (e.g., Step S2043 of FIG. 20) of the operation mode to be applied includes determining the operation mode to be applied based on at least the state information.

With the information processing method according to this item, the first user can intuitively determine the operation mode based on the inclination, position, and the like of the first controller.

(Item 4)

The information processing method according to Item 3, in which the determining (e.g., Step S2043 of FIG. 20) of the operation mode to be applied includes determining whether the first controller is in a first state, in which the first controller is held by the first user in both hands, or in a second state, in which the first controller is held by the first user in one hand, based on the inclination or the position of the first controller identified by the state information; and determining the first operation mode as the operation mode to be applied in response to a determination that the first controller is in the first state, or the second operation mode as the operation mode to be applied in response to a determination that the first controller is in the second state.

With the information processing method according to this item, the first user can intuitively switch between the first operation mode and the second operation mode in accordance with how the first controller is held (i.e., held in two-handed holding state or one-handed holding state).

(Item 5)

The information processing method according to Item 4, in which the controlling of the motion of the first avatar or the first character object in the virtual space includes controlling, when the second operation mode is to be applied (e.g., Step S2045 of FIG. 20), a motion of a part (hand object 7A) of a virtual body of the first avatar associated with a hand of the first user holding the first controller.

With the information processing method according to this item, a more intuitive avatar operation may be provided to the first user.

(Item 6)

The information processing method according to any one of Items 2 to 5, further including displaying, in the field-of-view image 1817, when the first operation mode is to be applied, the first avatar holding a controller object representing a virtual controller corresponding to the first controller.

With the information processing method according to this item, the first user can intuitively grasp that the first operation mode is applied based on the display content of the field-of-view image M1.

(Item 7)

The information processing method according to any one of Items 2 to 6, further including displaying, in the field-of-view image M1, when the second operation mode is to be applied, a part of the virtual body of the first avatar in a manner in accordance with the input operation on the first controller, and avoiding displaying a controller object representing a virtual controller corresponding to the first controller.

With the information processing method according to this item, the first user may intuitively grasp that the second operation mode is applied based on the display content of the field-of-view image M1.

(Item 8)

An information processing method to be executed on a computer (computer 200 or server 600) in order to provide a virtual space to a first user and a second user. The method includes acquiring virtual space data defining a virtual space including a first avatar associated with the first user, a first character object operated based on an input operation on a first controller used by the first user, a second avatar associated with the second user, a second character object operated based on an input operation on a second controller used by the second user, a first virtual camera defining a field-of-view image to be provided to a first head-mounted device that is worn by the first user and that has a first display, and a second virtual camera defining a field-of-view image defining a field-of-view image to be provided to a second head-mounted device that is worn by the second user and that has a second display. The method further includes providing the field-of-view image defined by the first virtual camera to the first user via the first head-mounted device. The method further includes providing the field-of-view image defined by the second virtual camera to the second user via the second head-mounted device.

With the information processing method according to this item, the first user and the second user can enjoy a game shared with each other in the virtual space 11 while recognizing the presence of each other via the first avatar and the second avatar. This enables the first user and the second avatar to easily obtain a sense of having fun with a plurality of people. As a result, the virtual experiences of the first user and the second user can be more entertaining.

(Item 9)

A non-transitory computer readable medium storing a program for executing the information processing method of any one of Items 1 to 8 on a computer.

(Item 10)

An apparatus, including a memory (memory module 520); and a processor (processor 210) coupled to the memory. The apparatus being configured to execute the information processing method of any one of Items 1 to 8 under control of the processor.

(Item 11)

An information processing method to be executed on a computer (computer 200 or server 600) in order to provide a virtual space 11 to a first user (user 5A) via a head-mounted device (HMD 120A) including a display (monitor 130). The method includes acquiring (e.g., Step S1601 of FIG. 16) virtual space data defining the virtual space 11 including a first avatar (avatar 5A) associated with the first user, a character object (player character 9A) operated based on an input operation on a controller 1460A used by the first user, a second avatar (avatar 5B) associated with a second user (user 5B), and a virtual camera 14A defining a field-of-view image 1817 to be provided to the head-mounted device. The method further includes determining (e.g., Step S2251 of FIG. 22) a viewpoint mode to be applied from among a plurality of viewpoint modes including a first viewpoint mode in which the virtual camera 14A is associated with a viewpoint of the first avatar, and a second viewpoint mode in which the virtual camera 14A is associated with a viewpoint of the character object based on at least one of an input operation determined in advance on the controller 1460A or a state of the controller 1460A. The method further includes providing (e.g., S2252 or S2253 of FIG. 22) the field-of-view image 1817 defined by the virtual camera 14A to the first user via the head-mounted device (HMD 120A) in accordance with the viewpoint mode to be applied.

With the information processing method according to this item, the first user can switch between the viewpoint of the first avatar and the viewpoint of the character object in the virtual space in which there are the first avatar associated with the first user and the character object that can be operated by the first user with the controller. As a result, the virtual experience of the first user can be more entertaining.

(Item 12)

The information processing method according to Item 11, further including outputting (e.g., S1310A of FIG. 13), when the second viewpoint mode is determined as the viewpoint mode to be applied, auxiliary information for identifying a position that the first user is looking at via the viewpoint of the character object to the computer 200 connected to a head-mounted device (HMD 120B) worn by the second user.

With the information processing method according to this item, when the second viewpoint mode is applied, the line-of-sight direction of the first avatar in the field-of-view image provided to the user can be appropriately expressed based on the auxiliary information.

(Item 13)

The information processing method according to Item 11 or 12, further including forcibly applying a viewpoint mode associated with a condition determined in advance when the condition is satisfied in the virtual space.

With the information processing method according to this item, it is possible to switch the viewpoint mode appropriately and forcibly based on satisfaction of the condition determined in advance, and operability of the first user may be improved.

(Item 14)

The information processing method according to Item 13, in which the forcibly applying of a viewpoint mode includes forcibly applying the first viewpoint mode in a case where a state of the character object is in a state determined in advance when the second viewpoint mode is applied.

With the information processing method according to this item, the viewpoint can be forcibly returned to a first operable avatar when, for example, a character object is in an inoperable state. As a result, the operability of the first user may be improved.

(Item 15)

A non-transitory computer readable medium storing program for executing the information processing method of any one of Items 11 to 14 on a computer.

(Item 16)

An apparatus, including a memory; and a processor coupled to the memory. The apparatus being configured to execute the information processing method of any one of Items 11 to 14 under control of the processor.

(Item 17)

An information processing method to be executed on a computer (computer 200 or server 600) in order to provide a virtual space 11 to a second user (user 5B). The method includes acquiring (e.g., Step S1601 of FIG. 16) virtual space data defining the virtual space 11 including a first avatar (avatar 6A) associated with a first user (user 5A), a character object (player character 9A) operated based on an input operation on a controller 1460A used by the first user, a second avatar (avatar 6B) associated with the second user (user 5B), a first virtual camera (virtual camera 14A) defining a field-of-view image 1817 to be provided to a first head-mounted device (HMD 120A) including a first display to be worn on the first user, and a second virtual camera (virtual camera 14B) defining a field-of-view image 2517 to be provided to a second head-mounted device (HMD 120B) including a second display to be worn on the second user. The method further includes providing (e.g., Step S1610 of FIG. 16) the field-of-view image 2517 defined by the second virtual camera to the second user via the second head-mounted device. The providing of the field-of-view image 2517 includes providing, when the first virtual camera is associated with a viewpoint of the character object, the field-of-view image 2517 in which a line-of-sight direction of the first avatar is expressed such that the first user faces a position that the first user is looking at via the viewpoint of the character object.

With the information processing method according to this item, when the second viewpoint mode is applied to the first user, the line-of-sight direction of the first avatar can be appropriately expressed such that the first user faces the position that the first user is actually looking at in the field-of-view image provided to the second user.

(Item 18)

An information processing method to be executed on a computer (computer 200 or server 600) in order to provide a virtual space 2 to a first user (user 5A) via a head-mounted device (HMD 120A) including a display (monitor 130). The method includes acquiring (e.g., Step S1601 of FIG. 16) virtual space data defining the virtual space 11 including a first avatar (avatar 6A), which is associated with the first user and includes a hand object 7A representing a virtual hand, a second avatar (avatar 6B) associated with a second user (user 5B), and a virtual camera 14A defining a field-of-view image 1817 to be provided to the head-mounted device. The method further includes determining (e.g., Step S2673 of FIG. 26), based on at least one of an input operation determined in advance on the controller 1460A used by the first user and a state of the controller 1460A, a mode to be applied from among a plurality of modes including a first mode in which motions of left and right hand objects 7A are determined based on a position of the controller 1460A, and a second mode in which the motions of the left and right hand objects 7A are determined separately from each other. The method further includes providing (e.g., Step S1610 of FIG. 16) the field-of-view image 1817 defined by the virtual camera 14A to the first user via the head-mounted device (e.g., Step S1610 of FIG. 16).

With the information processing method according to this item, even while actually operating, for example, the controller 1460A with both hands, the first user can cause the hand object 7A of the avatar 6A to execute a motion not associated with the actual motion of the hands of the first user by using the second mode. As a result, the virtual experience of the first user using the controller 1460A may be more versatile.

(Item 19)

The information processing method according to Item 18, further including acquiring (e.g., Step S2671 of FIG. 26) line-of-sight information (eye tracking data) for identifying a line-of-sight direction of the first user. The method further includes operating (e.g., S2675 of FIG. 26) any one of the left and right hand objects 7A based on the line-of-sight information when the second mode is applied.

With the information processing method according to this item, the first user can operate the left and right hand objects 7A based on the line-of-sight direction while operating the controller 1460A.

(Item 20)

The information processing method according to Item 19, in which the operating includes operating any one of the left and right hand objects 7A such that the one of the left and right hand objects 7A points to a specific position in the virtual space identified based on the line-of-sight information.

With the information processing method according to this item, the first user can cause the hand object 7A to execute a motion of pointing to a specific position based on the line-of-sight direction. Therefore, the first user may be provided with an intuitive virtual experience while operating the controller 1460A.

(Item 21)

The information processing method according to any one of Items 18 to 20, in which the left and right hand objects 7A are displayed holding a virtual controller corresponding to the controller 1460A with both hands when the first mode is applied in the field-of-view image 1817.

With the information processing method according to this item, based on the display content of the field-of-view image 1817, the first user can intuitively grasp that the first mode is applied.

(Item 22)

The information processing method according to Item 21, further including displaying a controller object 8A representing the virtual controller in the field-of-view image 1817.

With the information processing method according to this item, based on the display content of the field-of-view image 1817, the first user can more intuitively grasp that the first mode is applied.

(Item 23)

The information processing method according to Item 21, further including avoiding displaying the controller object 8A representing the virtual controller in the field-of-view image 1817.

With the information processing method according to this item, it is possible to prevent the world view of the virtual space from being impaired by avoiding displaying the controller object 8A in the field-of-view image 1817.

(Item 24)

The information processing method according to any one of Items 18 to 23, further including acquiring (e.g., Step S2671 of FIG. 26) state information for identifying an inclination and position of the controller 1460A, in which the determining includes determining (e.g., Step S2673 of FIG. 26) the mode to be applied at least based on the state information.

With the information processing method according to this item, the first user can intuitively determine the mode based on, for example, the inclination and position of the controller 1460A.

(Item 25)

A non-transitory computer readable medium storing a program for executing the information processing method of any one of Items 18 to 14 on a computer.

(Item 26)

An apparatus, including a memory (memory module 530): and a processor (processor 210) coupled to the memory. The apparatus being configured to execute the information processing method of any one of Items 18 to 24 under control of the processor.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

What is claimed is:

1. An information processing method comprising:
providing a virtual space to a first user via a head-mounted device (HMD) including a display;
acquiring virtual space data defining the virtual space including a first avatar associated with the first user, a character object operable based on an input operation on a controller usable by the first user, a second avatar associated with a second user, and a virtual camera defining a field-of-view image to be provided to the HMD;
determining a viewpoint mode from among a plurality of viewpoint modes, wherein the plurality of viewpoint modes includes a first viewpoint mode in which the virtual camera is associated with a viewpoint of the first avatar, and a second viewpoint mode in which the virtual camera is associated with a viewpoint of the character object, wherein the viewpoint is determined based on at least one of an input operation determined in advance on the controller or a state of the controller, and providing the field-of-view image to the first user via the HMD in accordance with the viewpoint mode to be applied.

2. The information processing method of claim 1, further comprising outputting to the second user, in response to determined viewpoint mode being the second viewpoint mode, auxiliary information for identifying a position in the virtual space that the first user is looking.

3. The information processing method of claim 2, wherein the outputting to the second user is performed using a second HMD.

4. The information processing method of claim 1, further comprising forcibly applying a viewpoint mode of the plurality of viewpoint modes in response to satisfaction of a predetermined condition being satisfied in the virtual space.

5. The information processing method of claim 4, wherein forcibly applying the viewpoint mode forcibly applying the first viewpoint mode in a case where a state of the character object is in a predetermined state determined while the second viewpoint mode is applied.

6. The information processing method of claim 5, wherein the predetermined state is a state where the player character object is unable to fight.

7. The information processing method of claim 4, wherein forcibly applying the viewpoint mode forcibly applying the second viewpoint mode in a case where a predetermined event occurs in the virtual space while the first viewpoint mode is applied.

8. An non-transitory computer readable medium for storing instructions, which when executed by a processor are configured to cause the processor to:

generate a virtual space to a first user displayable via a head-mounted device (HMD) including a display;

acquire virtual space data defining the virtual space including a first avatar associated with the first user, a character object operable based on an input operation on a controller usable by the first user, a second avatar associated with a second user, and a virtual camera defining a field-of-view image to be provided to the HMD;

determine a viewpoint mode from among a plurality of viewpoint modes, wherein the plurality of viewpoint modes includes a first viewpoint mode in which the virtual camera is associated with a viewpoint of the first avatar, and a second viewpoint mode in which the virtual camera is associated with a viewpoint of the character object, wherein the viewpoint is determined based on at least one of an input operation determined in advance on the controller or a state of the controller, and provide the field-of-view image to the HMD of the first user in accordance with the viewpoint mode to be applied.

9. The non-transitory computer readable medium of claim 8, wherein the instructions are further configured to cause the processor to generate instructions for outputting to the second user, in response to determined viewpoint mode being the second viewpoint mode, auxiliary information for identifying a position in the virtual space that the first user is looking.

10. The non-transitory computer readable medium of claim 9, wherein the instructions are further configured to cause the processor to instruct a second HMD for outputting to the second user.

11. The non-transitory computer readable medium of claim 8, wherein the instructions are configured to cause the processor to forcibly apply a viewpoint mode of the plurality of viewpoint modes in response to satisfaction of a predetermined condition being satisfied in the virtual space.

12. The non-transitory computer readable medium of claim 11, wherein the instructions are configured to cause the processor to forcibly apply the viewpoint mode by forcibly applying the first viewpoint mode in a case where a state of the character object is in a predetermined state determined while the second viewpoint mode is applied.

13. The non-transitory computer readable medium of claim 12, wherein the predetermined state is a state where the player character object is unable to fight.

14. The non-transitory computer readable medium of claim 11, wherein the instructions are configured to cause the processor to forcibly apply the viewpoint mode by forcibly applying the second viewpoint mode in a case where a predetermined event occurs in the virtual space while the first viewpoint mode is applied.

15. A system comprising:
a head-mounted device (HMD), wherein the HMD includes a display;
a non-transitory computer readable medium configured to store instructions thereon; and
a processor connected to the HMD and the non-transitory computer readable medium, wherein the processor is configured to execute the instructions to:
generate a virtual space to a first user displayable via the HMD;
acquire virtual space data defining the virtual space including a first avatar associated with the first user, a character object operable based on an input operation on a controller usable by the first user, a second avatar associated with a second user, and a virtual camera defining a field-of-view image to be provided to the HMD;
determine a viewpoint mode from among a plurality of viewpoint modes, wherein the plurality of viewpoint modes includes a first viewpoint mode in which the virtual camera is associated with a viewpoint of the first avatar, and a second viewpoint mode in which the virtual camera is associated with a viewpoint of the character object, wherein the viewpoint is determined based on at least one of an input operation determined in advance on the controller or a state of the controller, and
provide the field-of-view image to the HMD of the first user in accordance with the viewpoint mode to be applied.

16. The system of claim 15, wherein the processor is further configured to execute the instructions to generate instructions for outputting to the second user, in response to determined viewpoint mode being the second viewpoint mode, auxiliary information for identifying a position in the virtual space that the first user is looking.

17. The system of claim 16, further comprising a second HMD, wherein the processor is configured to execute the instructions to instruct the second HMD for outputting to the second user.

18. The system of claim 15, wherein processor is configured to execute the instructions to forcibly apply a viewpoint mode of the plurality of viewpoint modes in response to satisfaction of a predetermined condition being satisfied in the virtual space.

19. The system of claim 18, wherein the processor is configured to execute the instructions to forcibly apply the viewpoint mode by forcibly applying the first viewpoint mode in a case where a state of the character object is in a predetermined state determined while the second viewpoint mode is applied.

20. The system of claim 19, wherein the predetermined state is a state where the player character object is unable to fight.

* * * * *